United States Patent
Yamashima et al.

(10) Patent No.: US 9,542,225 B2
(45) Date of Patent: Jan. 10, 2017

(54) METHOD AND APPARATUS FOR DETERMINING ALLOCATION DESIGN OF VIRTUAL MACHINES

(71) Applicant: FUJITSU LIMITED, Kawasaki-shi, Kanagawa (JP)

(72) Inventors: Hiroyuki Yamashima, Kawasaki (JP); Keisuke Fukui, Yokohama (JP)

(73) Assignee: FUJITSU LIMITED, Kawasaki (JP)

(*) Notice: Subject to any disclaimer, the term of this patent is extended or adjusted under 35 U.S.C. 154(b) by 447 days.

(21) Appl. No.: 14/144,642

(22) Filed: Dec. 31, 2013

(65) Prior Publication Data

US 2014/0115168 A1 Apr. 24, 2014

Related U.S. Application Data

(63) Continuation of application No. PCT/JP2011/065272, filed on Jul. 4, 2011.

(51) Int. Cl.
*G06F 15/173* (2006.01)
*G06F 9/50* (2006.01)
*G06F 9/455* (2006.01)

(52) U.S. Cl.
CPC .......... *G06F 9/5011* (2013.01); *G06F 9/455* (2013.01); *G06F 9/5077* (2013.01); *G06F 9/5083* (2013.01)

(58) Field of Classification Search
CPC .......... H04L 67/1012; H04L 43/0876; G06F 11/1484; G06F 2009/4557; G06F 2009/45591; G06F 9/45558

(Continued)

(56) References Cited

U.S. PATENT DOCUMENTS 8,200,995 B2 6/2012 Shiga et al.
2004/0143664 A1 7/2004 Usa et al.
(Continued)

FOREIGN PATENT DOCUMENTS

EP 2 109 028 A2 10/2009
JP 2010-15192 A 1/2010
(Continued)

OTHER PUBLICATIONS

International Search Report issued on Oct. 4, 2011 for PCT/JP2011/065272 filed on Jul. 4, 2011, English translation.
(Continued)

*Primary Examiner* — Hitesh Patel
(74) *Attorney, Agent, or Firm* — Oblon, McClelland, Maier & Neustadt, L.L.P.

(57) ABSTRACT

A disclosed method includes: receiving a request to allocate one or plural virtual machines for a system that includes the one or plural virtual machines to one or plural physical machine; reading out first data concerning an evaluation indicator for virtual machine allocation, wherein the first data is registered in association with the system or a requesting source of the request; first calculating, for each virtual machine of the one or plural virtual machines, a first cost in case where the virtual machine is allocated to any one of usable physical machines, based on the read first data to identify, for each virtual machine of the one or plural virtual machines, a physical machine for which the calculated first cost is the least; and generating allocation design data including second data concerning the physical machine identified for each virtual machine of the one or plural virtual machines.

6 Claims, 46 Drawing Sheets

(58) Field of Classification Search
USPC .................................. 709/224, 226; 718/1
See application file for complete search history.

(56) References Cited

U.S. PATENT DOCUMENTS

| | | | |
|---|---|---|---|
| 2007/0204266 A1* | 8/2007 | Beaty .................. | G06F 9/45558 718/1 |
| 2008/0104587 A1* | 5/2008 | Magenheimer ....... | G06F 1/3203 718/1 |
| 2009/0327778 A1* | 12/2009 | Shiga ................. | G05D 23/1919 713/320 |
| 2010/0162259 A1* | 6/2010 | Koh .................... | G06F 9/45558 718/104 |
| 2010/0199285 A1 | 8/2010 | Medovich | |
| 2012/0216053 A1 | 8/2012 | Yamashima | |
| 2016/0164797 A1* | 6/2016 | Reque .................... | H04L 47/70 718/1 |

FOREIGN PATENT DOCUMENTS

| | | |
|---|---|---|
| JP | 2010-218307 A | 9/2010 |
| JP | 2011-95871 A | 5/2011 |
| JP | 2012-174068 A | 9/2012 |

OTHER PUBLICATIONS

Extended European Search Report issued Dec. 4, 2014 in Patent Application No. 11869051.0.

\* cited by examiner

| ID OF EVALUATION PLUG-IN | NAME OF EVALUATION PLUG-IN | SYNTHESIS COEFFICIENT |
|---|---|---|
| PI-0 | AVAILABILITY | 1 |
| PI-1 | POWER | 10 |
| PI-2 | VM MOVEMENT COST | 1 |
| PI-3 | SOFTWARE LICENSE | 5 |
| PI-5 | ORGANIZATION AGGREGATION | 0.2 |
| PI-7 | NETWORK UTILIZATION | 3 |
| ⋮ | | ⋮ |

FIG.3

| SYSTEM ID | DATA OF APPLIED EVALUATION PLUG-IN |
|---|---|
| SYS001 | Default |
| SYS002 | Default |
| SYS003 | [PI-0:10], [PI-1:1], [PI-3:1], [PI-7:5] |
| SYS004 | [PI-0:5], [PI-1:1] |
| SYS008 | Default |
| SYS012 | [PI-0:1], [PI-1:1], [PI-2:1], [PI-3:1], [PI-5:1], [PI-7:1], ... |
| ⋮ | ⋮ |

FIG.4

| PHYSICAL SERVER ID | SPECIFICATION (CONVERTED TO UNIT SIZE) | MAXIMUM NO. OF ALLOCATABLE VMs | ID OF CONNECTION SWITCH | IDs OF ALLOCATED VMs | IDs OF PRELIMINARILY ALLOCATED VMs | POWER-SUPPLY STATE |
|---|---|---|---|---|---|---|
| Svr001 | 16 | 16 | SW001 | VM001-01, VM002-03, VM005-05 | VM008-01 | ON |
| Svr002 | 16 | 16 | SW001 | VM001-02, VM002-02, VM005-04 | — | ON |
| Svr003 | 16 | 16 | SW001 | VM001-03, VM006-01 | — | ON |
| ... | ... | ... | ... | ... | ... | ... |
| Svr051 | 4 | 4 | SW011 | — | — | OFF |
| Svr052 | 4 | 4 | SW011 | — | — | OFF |
| Svr053 | 4 | 4 | SW011 | — | — | OFF |
| ... | ... | ... | ... | ... | ... | ... |

FIG.5

| SYSTEM ID | VM ID | NET ID |
|---|---|---|
| SYS001 | VM001-01, VM001-02, VM001-03, VM001-04 | NET001-01, NET001-02, NET001-03 |
| SYS002 | VM002-01, VM002-02, VM002-03 | NET002-01 |
| SYS003 | VM003-01, VM003-02, VM003-03, VM003-04, VM003-05, VM003-06 | NET003-01, NET001-02 |
| SYS004 | VM004-01, VM004-02 | NET004-01 |
| ⋮ | ⋮ | ⋮ |

FIG.6

| SYSTEM ID | NET ID | IDs OF RELATED VMs |
|---|---|---|
| SYS001 | NET001-01 | VM001-01, VM001-02 |
| | NET001-02 | VM001-02, VM001-03 |
| | NET001-03 | VM001-03, VM001-04 |
| SYS002 | NET002-01 | VM002-01, VM002-02, VM002-03 |
| SYS003 | NET003-01 | VM003-01, VM003-02, VM003-03, VM003-04, VM003-05 |
| | NET001-02 | VM003-02, VM003-03, VM003-04, VM003-05, VM003-06 |
| SYS004 | NET004-01 | VM004-01, VM004-02 |
| ⋮ | ⋮ | ⋮ |

FIG.7

| SYSTEM ID | CLASS | IDs OF VMs THAT BELONG TO THIS CLASS |
|---|---|---|
| SYS001 | FW | VM001-01 |
| | WEB | VM001-02, |
| | APP | VM001-03 |
| | DB | VM001-04 |
| SYS002 | FW | VM002-01 |
| | WEB | VM002-02 |
| | APP/DB | VM002-03 |
| SYS003 | FW | VM003-01 |
| | WEB | VM003-02, VM003-03, VM003-04, VM003-05 |
| | APP/DB | VM003-06 |
| SYS004 | FW | VM004-01 |
| | WEB | VM004-02 |
| ⋮ | ⋮ | ⋮ |

FIG.8

| VM ID | SYSTEM ID | CLASS | SIZE | IDs OF CONNECTED NETWORKS | ID OF ALLOCATION DESTINATION PHYSICAL SERVER | ID OF PRELIMINARY ALLOCATION DESTINATION PHYSICAL SERVER |
|---|---|---|---|---|---|---|
| VM001-01 | SYS001 | FW | 1 | NET001-01 | Svr001 | — |
| VM001-02 | SYS001 | WEB | 2 | NET001-01, NET001-02 | Svr002 | — |
| VM001-03 | SYS001 | WEB | 2 | NET001-01, NET001-02 | Svr003 | — |
| ... | ... | ... | ... | ... | ... | ... |
| VM005-01 | SYS005 | FW | 1 | NET005-01 | — | Svr063 |
| VM005-02 | SYS005 | WEB | 1 | NET005-01, NET005-02 | — | — |
| VM005-03 | SYS005 | APP | 1 | NET005-02, NET005-03 | — | — |
| ... | ... | ... | ... | ... | ... | ... |

FIG.9

| SYSTEM ID | DATA OF APPLIED EVALUATION PLUG-IN |
|---|---|
| SYS005 | [PI-0:1], [PI-1:2], [PI-7:1] |

| SYSTEM ID | VM ID | NET ID |
|---|---|---|
| SYS005 | VM005-01, VM005-02, VM005-03, VM005-04, VM005-05, VM005-06, VM005-07, VM005-08 | NET005-01, NET005-02, NET005-03 |

| SYSTEM ID | NET ID | IDs OF RELATED VMs |
|---|---|---|
| SYS005 | NET005-01 | VM005-01, VM005-02, VM005-03, VM005-04, VM005-05 |
| | NET005-02 | VM005-02, VM005-03, VM005-04, VM005-05, VM005-06, VM005-07 |
| | NET005-03 | VM005-06 VM005-07, VM005-08 |

FIG.14

| SYSTEM ID | CLASS | SIZE | IDs OF VMs THAT BELONG TO THIS CLASS |
|---|---|---|---|
| SYS005 | FW | 1 | VM005-01 |
| | WEB | 2 | VM005-02, VM005-03, VM005-04, VM005-05 |
| | APP | 4 | VM005-06, VM005-07 |
| | DB | 8 | VM005-08 |

FIG.15

| PHYSICAL SERVER ID | SPECIFICATION (CONVERTED TO UNIT SIZE) | REMAINING ALLOCATABLE SIZE | MAXIMUM NO. OF ALLOCATABLE VMs | ID OF CONNECTION SWITCH | IDs OF ALLOCATED VMs | IDs OF PRELIMINARILY ALLOCATED VMs | POWER-SUPPLY STATE |
|---|---|---|---|---|---|---|---|
| Svr001 | 16 | 16 | 16 | SW001 | — | — | OFF |
| Svr002 | 16 | 16 | 16 | SW001 | — | — | OFF |
| Svr003 | 16 | 16 | 16 | SW001 | — | — | OFF |
| ... | ... | ... | ... | ... | ... | ... | ... |
| Svr010 | 16 | 16 | 16 | SW001 | — | — | OFF |
| Svr011 | 16 | 16 | 16 | SW002 | — | — | OFF |
| Svr012 | 16 | 16 | 16 | SW002 | — | — | OFF |
| ... | ... | ... | ... | ... | ... | ... | ... |
| Svr098 | 16 | 16 | 16 | SW010 | — | — | OFF |
| Svr099 | 16 | 16 | 16 | SW010 | — | — | OFF |
| Svr100 | 16 | 16 | 16 | SW010 | — | — | OFF |

FIG.18

| COST VALUE | PHYSICAL SERVER ID |
|---|---|
| 0 | Svr003, Svr004, Svr005, Svr006, Svr007, Svr008, Svr009, Svr010, ......, Svr100 |
| 30 | Svr001, Svr002 |

| COST VALUE | PHYSICAL SERVER ID |
|---|---|
| 0 | Svr001, Svr002 |
| 10 | Svr003, Svr004, Svr005, Svr006, Svr007, Svr008, Svr009, Svr010, ......, Svr100 |

FIG.25

| COST VALUE | PHYSICAL SERVER ID |
|---|---|
| 0 | Svr001 |
| 1 | Svr002, Svr003, Svr004, Svr005, Svr006, Svr007, Svr008, Svr009, Svr010 |
| 30 | Svr011, Svr012, Svr013, Svr014, Svr015, Svr016, Svr017, Svr018, Svr019, Svr020, ......, Svr100 |

FIG.26

| COST VALUE | PHYSICAL SERVER ID |
|---|---|
| 21 | Svr003, Svr004, Svr005, Svr006, Svr007, Svr008, Svr009, Svr010 |
| 30 | Svr001 |
| 31 | Svr002 |
| 50 | Svr011, Svr012, Svr013, Svr014, Svr015, Svr016, Svr017, Svr018, Svr019, Svr020, ......, Svr100 |

FIG.27

| PHYSICAL SERVER ID | SPECIFICATION (CONVERTED TO UNIT SIZE) | REMAINING ALLOCATABLE SIZE | MAXIMUM NO. OF ALLOCATABLE VMs | ID OF CONNECTION SWITCH | IDs OF ALLOCATED VMs | IDs OF PRELIMINARILY ALLOCATED VMs | POWER-SUPPLY STATE |
|---|---|---|---|---|---|---|---|
| Svr001 | 16 | 13 | 16 | SW001 | — | VM005-01, VM005-02 | OFF |
| Svr002 | 16 | 14 | 16 | SW001 | — | VM005-03 | OFF |
| Svr003 | 16 | 16 | 16 | SW001 | — | — | OFF |
| ... | ... | ... | ... | ... | ... | ... | ... |
| Svr010 | 16 | 16 | 16 | SW001 | — | — | OFF |
| Svr011 | 16 | 16 | 16 | SW002 | — | — | OFF |
| Svr012 | 16 | 16 | 16 | SW002 | — | — | OFF |
| ... | ... | ... | ... | ... | ... | ... | ... |
| Svr098 | 16 | 16 | 16 | SW010 | — | — | OFF |
| Svr099 | 16 | 16 | 16 | SW010 | — | — | OFF |
| Svr100 | 16 | 16 | 16 | SW010 | — | — | OFF |

FIG.28

| VM ID | SYSTEM ID | CLASS | SIZE | IDs OF CONNECTED NETWORKS | ID OF ALLOCATION DESTINATION PHYSICAL SERVER | ID OF PRELIMINARY ALLOCATION DESTINATION PHYSICAL SERVER |
|---|---|---|---|---|---|---|
| VM005-01 | SYS005 | FW | 1 | NET005-01 | — | Svr001 |
| VM005-02 | SYS005 | WEB | 2 | NET005-01, NET005-02 | — | Svr001 |
| VM005-03 | SYS005 | WEB | 2 | NET005-01, NET005-02 | — | Svr002 |
| VM005-04 | SYS005 | WEB | 2 | NET005-01, NET005-02 | — | — |
| VM005-05 | SYS005 | WEB | 2 | NET005-01, NET005-02 | — | — |
| VM005-06 | SYS005 | APP | 4 | NET005-02, NET005-03 | — | — |
| VM005-07 | SYS005 | APP | 4 | NET005-02, NET005-03 | — | — |
| VM005-08 | SYS005 | DB | 8 | NET005-03 | — | — |

FIG.29

| PHYSICAL SERVER ID | SPECIFICATION (CONVERTED TO UNIT SIZE) | REMAINING ALLOCATABLE SIZE | MAXIMUM NO. OF ALLOCATABLE VMs | ID OF CONNECTION SWITCH | IDs OF ALLOCATED VMs | IDs OF PRELIMINARILY ALLOCATED VMs | POWER-SUPPLY STATE |
|---|---|---|---|---|---|---|---|
| Svr001 | 16 | 13 | 16 | SW001 | — | VM005-01, VM005-02 | OFF |
| Svr002 | 16 | 14 | 16 | SW001 | — | VM005-03 | OFF |
| Svr003 | 16 | 14 | 16 | SW001 | — | VM005-04 | OFF |
| ... | ... | ... | ... | ... | ... | ... | ... |
| Svr010 | 16 | 16 | 16 | SW001 | — | — | OFF |
| Svr011 | 16 | 16 | 16 | SW002 | — | — | OFF |
| Svr012 | 16 | 16 | 16 | SW002 | — | — | OFF |
| ... | ... | ... | ... | ... | ... | ... | ... |
| Svr098 | 16 | 16 | 16 | SW010 | — | — | OFF |
| Svr099 | 16 | 16 | 16 | SW010 | — | — | OFF |
| Svr100 | 16 | 16 | 16 | SW010 | — | — | OFF |

FIG.30

| VM ID | SYSTEM ID | CLASS | SIZE | IDs OF CONNECTED NETWORKS | ID OF ALLOCATION DESTINATION PHYSICAL SERVER | ID OF PRELIMINARY ALLOCATION DESTINATION PHYSICAL SERVER |
|---|---|---|---|---|---|---|
| VM005-01 | SYS005 | FW | 1 | NET005-01 | — | Svr001 |
| VM005-02 | SYS005 | WEB | 2 | NET005-01, NET005-02 | — | Svr001 |
| VM005-03 | SYS005 | WEB | 2 | NET005-01, NET005-02 | — | Svr002 |
| VM005-04 | SYS005 | WEB | 2 | NET005-01, NET005-02 | — | Svr003 |
| VM005-05 | SYS005 | WEB | 2 | NET005-01, NET005-02 | — | — |
| VM005-06 | SYS005 | APP | 4 | NET005-02, NET005-03 | — | — |
| VM005-07 | SYS005 | APP | 4 | NET005-02, NET005-03 | — | — |
| VM005-08 | SYS005 | DB | 8 | NET005-03 | — | — |

FIG.31

| VM ID | SYSTEM ID | CLASS | SIZE | IDs OF CONNECTED NETWORKS | ID OF DETERMINED ALLOCATION DESTINATION PHYSICAL SERVER |
|---|---|---|---|---|---|
| VM005-01 | SYS005 | FW | 1 | NET005-01 | Svr001 |
| VM005-02 | SYS005 | WEB | 2 | NET005-01, NET005-02 | Svr001 |
| VM005-03 | SYS005 | WEB | 2 | NET005-01, NET005-02 | Svr002 |
| VM005-04 | SYS005 | WEB | 2 | NET005-01, NET005-02 | Svr003 |
| VM005-05 | SYS005 | WEB | 2 | NET005-01, NET005-02 | Svr004 |
| VM005-06 | SYS005 | APP | 4 | NET005-02, NET005-03 | Svr001 |
| VM005-07 | SYS005 | APP | 4 | NET005-02, NET005-03 | Svr002 |
| VM005-08 | SYS005 | DB | 8 | NET005-03 | Svr001 |

FIG.32

| DESIGNATED NO. OF PHYSICAL SERVERS | 99 |

| TIMEOUT TIME | 10 SECONDS |

| VM ID | SYSTEM ID | CLASS | SIZE | IDs OF CONNECTED NETWORKS | ID OF ALLOCATION DESTINATION PHYSICAL SERVER | ID OF PRELIMINARY ALLOCATION DESTINATION PHYSICAL SERVER |
|---|---|---|---|---|---|---|
| VM005-01 | SYS005 | FW | 1 | NET005-01 | — | Svr009 |
| VM005-02 | SYS005 | WEB | 2 | NET005-01, NET005-02 | — | Svr010 |
| VM005-03 | SYS005 | WEB | 2 | NET005-01, NET005-02 | — | Svr011 |
| VM005-04 | SYS005 | WEB | 2 | NET005-01, NET005-02 | — | Svr012 |
| VM005-05 | SYS005 | WEB | 2 | NET005-01, NET005-02 | — | Svr013 |
| VM005-06 | SYS005 | APP | 4 | NET005-02, NET005-03 | — | Svr011 |
| VM005-07 | SYS005 | APP | 4 | NET005-02, NET005-03 | — | Svr012 |
| VM005-08 | SYS005 | DB | 8 | NET005-03 | — | Svr011 |

FIG.37

| SYSTEM EVALUATION VALUE | VM ID | SYSTEM ID | CLASS | SIZE | IDs OF CONNECTED NETWORKS | ID OF ALLOCATION DESTINATION PHYSICAL SERVER | ID OF PRELIMINARY ALLOCATION DESTINATION PHYSICAL SERVER |
|---|---|---|---|---|---|---|---|
| 216 | VM005-01 | SYS005 | FW | 1 | NET005-01 | — | Svr009 |
| | VM005-02 | SYS005 | WEB | 2 | NET005-01, NET005-02 | — | Svr010 |
| | VM005-03 | SYS005 | WEB | 2 | NET005-01, NET005-02 | — | Svr011 |
| | VM005-04 | SYS005 | WEB | 2 | NET005-01, NET005-02 | — | Svr012 |
| | VM005-05 | SYS005 | WEB | 2 | NET005-01, NET005-02 | — | Svr013 |
| | VM005-06 | SYS005 | APP | 4 | NET005-02, NET005-03 | — | Svr011 |
| | VM005-07 | SYS005 | APP | 4 | NET005-02, NET005-03 | — | Svr012 |
| | VM005-08 | SYS005 | DB | 8 | NET005-03 | | Svr011 |

FIG.38

| VM ID | SYSTEM ID | CLASS | SIZE | IDs OF CONNECTED NETWORKS | ID OF ALLOCATION DESTINATION PHYSICAL SERVER | ID OF PRELIMINARY ALLOCATION DESTINATION PHYSICAL SERVER |
|---|---|---|---|---|---|---|
| VM005-01 | SYS005 | FW | 1 | NET005-01 | — | Svr011 |
| VM005-02 | SYS005 | WEB | 2 | NET005-01, NET005-02 | — | Svr014 |
| VM005-03 | SYS005 | WEB | 2 | NET005-01, NET005-02 | — | Svr011 |
| VM005-04 | SYS005 | WEB | 2 | NET005-01, NET005-02 | — | Svr012 |
| VM005-05 | SYS005 | WEB | 2 | NET005-01, NET005-02 | — | Svr013 |
| VM005-06 | SYS005 | APP | 4 | NET005-02, NET005-03 | — | Svr011 |
| VM005-07 | SYS005 | APP | 4 | NET005-02, NET005-03 | — | Svr012 |
| VM005-08 | SYS005 | DB | 8 | NET005-03 | — | Svr011 |

FIG.39

| SYSTEM EVALUATION VALUE | VM ID | SYSTEM ID | CLASS | SIZE | IDs OF CONNECTED NETWORKS | ID OF ALLOCATION DESTINATION PHYSICAL SERVER | ID OF PRELIMINARY ALLOCATION DESTINATION PHYSICAL SERVER |
|---|---|---|---|---|---|---|---|
| 90 | VM005-01 | SYS005 | FW | 1 | NET005-01 | — | Svr011 |
| | VM005-02 | SYS005 | WEB | 2 | NET005-01, NET005-02 | — | Svr014 |
| | VM005-03 | SYS005 | WEB | 2 | NET005-01, NET005-02 | — | Svr011 |
| | VM005-04 | SYS005 | WEB | 2 | NET005-01, NET005-02 | — | Svr012 |
| | VM005-05 | SYS005 | WEB | 2 | NET005-01, NET005-02 | — | Svr013 |
| | VM005-06 | SYS005 | APP | 4 | NET005-02, NET005-03 | — | Svr011 |
| | VM005-07 | SYS005 | APP | 4 | NET005-02, NET005-03 | — | Svr012 |
| | VM005-08 | SYS005 | DB | 8 | NET005-03 | — | Svr011 |

FIG.40

| SYSTEM EVALUATION VALUE | VM ID | SYSTEM ID | CLASS | SIZE | IDs OF CONNECTED NETWORKS | ID OF ALLOCATION DESTINATION PHYSICAL SERVER | ID OF PRELIMINARY ALLOCATION DESTINATION PHYSICAL SERVER |
|---|---|---|---|---|---|---|---|
| 216 | VM005-01 | SYS005 | FW | 1 | NET005-01 | — | Svr009 |
| | VM005-02 | SYS005 | WEB | 2 | NET005-01, NET005-02 | — | Svr010 |
| | VM005-03 | SYS005 | WEB | 2 | NET005-01, NET005-02 | — | Svr011 |
| | VM005-04 | SYS005 | WEB | 2 | NET005-01, NET005-02 | — | Svr012 |
| | VM005-05 | SYS005 | WEB | 2 | NET005-01, NET005-02 | — | Svr013 |
| | VM005-06 | SYS005 | APP | 4 | NET005-02, NET005-03 | — | Svr011 |
| | VM005-07 | SYS005 | APP | 4 | NET005-02, NET005-03 | — | Svr012 |
| | VM005-08 | SYS005 | DB | 8 | NET005-03 | — | Svr011 |

| TEMPORARY SERVER ID |
|---|
| — |

FIG.47

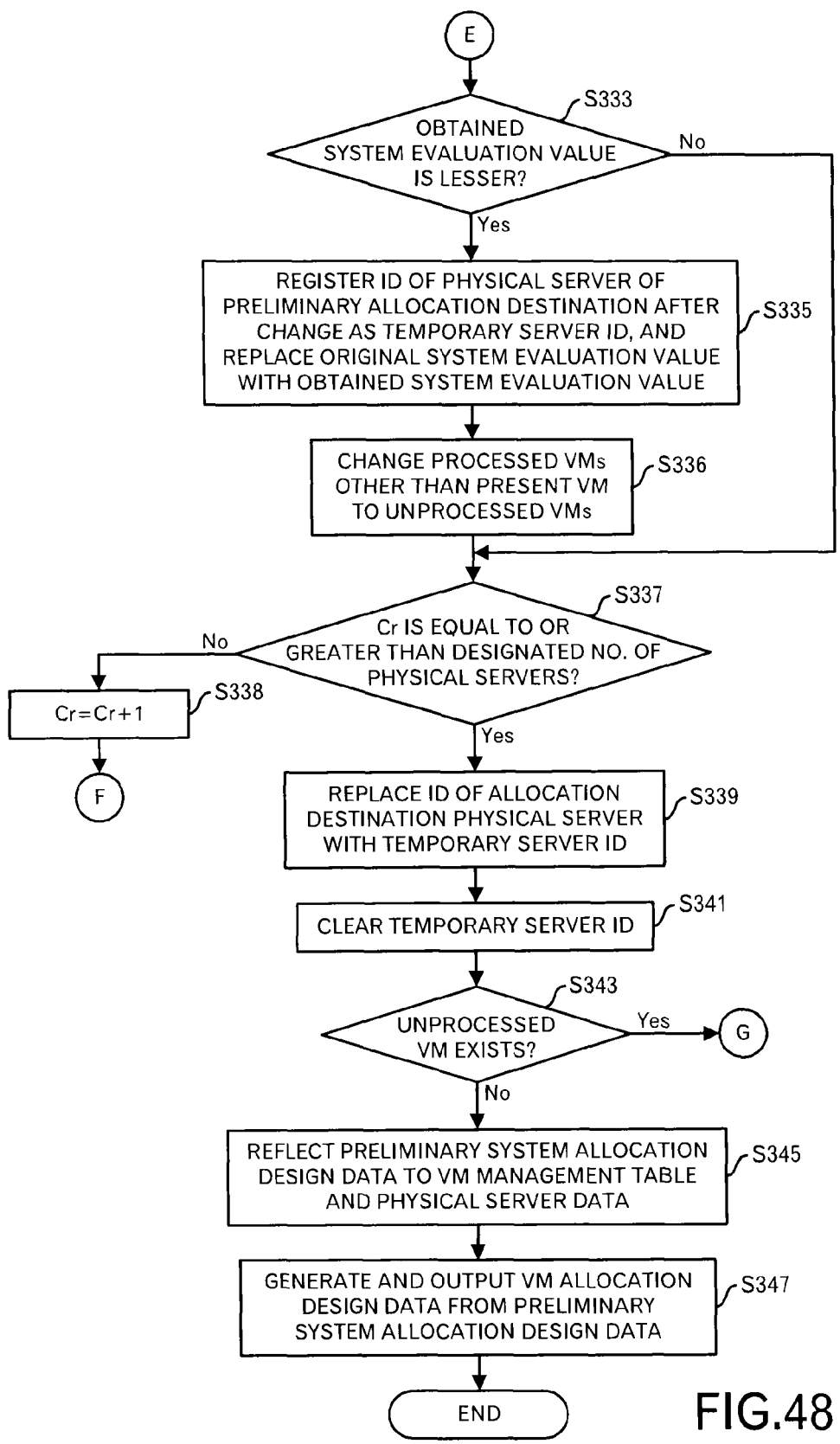

| SYSTEM EVALUATION VALUE | VM ID | SYSTEM ID | CLASS | SIZE | IDs OF CONNECTED NETWORKS | ID OF ALLOCATION DESTINATION PHYSICAL SERVER | ID OF PRELIMINARY ALLOCATION DESTINATION PHYSICAL SERVER |
|---|---|---|---|---|---|---|---|
| 157 | VM005-01 | SYS005 | FW | 1 | NET005-01 | — | Svr011 |
| | VM005-02 | SYS005 | WEB | 2 | NET005-01, NET005-02 | — | Svr010 |
| | VM005-03 | SYS005 | WEB | 2 | NET005-01, NET005-02 | — | Svr011 |
| | VM005-04 | SYS005 | WEB | 2 | NET005-01, NET005-02 | — | Svr012 |
| | VM005-05 | SYS005 | WEB | 2 | NET005-01, NET005-02 | — | Svr013 |
| | VM005-06 | SYS005 | APP | 4 | NET005-02, NET005-03 | — | Svr011 |
| | VM005-07 | SYS005 | APP | 4 | NET005-02, NET005-03 | — | Svr012 |
| | VM005-08 | SYS005 | DB | 8 | NET005-03 | — | Svr011 |

| TEMPORARY SERVER ID |
|---|
| Svr011 |

FIG.49

| SYSTEM EVALUATION VALUE | VM ID | SYSTEM ID | CLASS | SIZE | IDs OF CONNECTED NETWORKS | ID OF ALLOCATION DESTINATION PHYSICAL SERVER | ID OF PRELIMINARY ALLOCATION DESTINATION PHYSICAL SERVER |
|---|---|---|---|---|---|---|---|
| 157 | VM005-01 | SYS005 | FW | 1 | NET005-01 | — | Svr011 |
| | VM005-02 | SYS005 | WEB | 2 | NET005-01, NET005-02 | — | Svr010 |
| | VM005-03 | SYS005 | WEB | 2 | NET005-01, NET005-02 | — | Svr011 |
| | VM005-04 | SYS005 | WEB | 2 | NET005-01, NET005-02 | — | Svr012 |
| | VM005-05 | SYS005 | WEB | 2 | NET005-01, NET005-02 | — | Svr013 |
| | VM005-06 | SYS005 | APP | 4 | NET005-02, NET005-03 | — | Svr011 |
| | VM005-07 | SYS005 | APP | 4 | NET005-02, NET005-03 | — | Svr012 |
| | VM005-08 | SYS005 | DB | 8 | NET005-03 | — | Svr011 |

| TEMPORARY SERVER ID |
|---|
| — |

FIG.50

| SYSTEM EVALUATION VALUE | VM ID | SYSTEM ID | CLASS | SIZE | IDs OF CONNECTED NETWORKS | ID OF ALLOCATION DESTINATION PHYSICAL SERVER | ID OF PRELIMINARY ALLOCATION DESTINATION PHYSICAL SERVER |
|---|---|---|---|---|---|---|---|
| 99 | VM005-01 | SYS005 | FW | 1 | NET005-01 | — | Svr011 |
| | VM005-02 | SYS005 | WEB | 2 | NET005-01, NET005-02 | — | Svr012 |
| | VM005-03 | SYS005 | WEB | 2 | NET005-01, NET005-02 | — | Svr011 |
| | VM005-04 | SYS005 | WEB | 2 | NET005-01, NET005-02 | — | Svr012 |
| | VM005-05 | SYS005 | WEB | 2 | NET005-01, NET005-02 | — | Svr013 |
| | VM005-06 | SYS005 | APP | 4 | NET005-02, NET005-03 | — | Svr011 |
| | VM005-07 | SYS005 | APP | 4 | NET005-02, NET005-03 | — | Svr012 |
| | VM005-08 | SYS005 | DB | 8 | NET005-03 | — | Svr011 |

| TEMPORARY SERVER ID |
|---|
| Svr012 |

FIG.51

| SYSTEM EVALUATION VALUE | VM ID | SYSTEM ID | CLASS | SIZE | IDs OF CONNECTED NETWORKS | ID OF ALLOCATION DESTINATION PHYSICAL SERVER | ID OF PRELIMINARY ALLOCATION DESTINATION PHYSICAL SERVER |
|---|---|---|---|---|---|---|---|
| 90 | VM005-01 | SYS005 | FW | 1 | NET005-01 | — | Svr011 |
| | VM005-02 | SYS005 | WEB | 2 | NET005-01, NET005-02 | — | Svr014 |
| | VM005-03 | SYS005 | WEB | 2 | NET005-01, NET005-02 | — | Svr011 |
| | VM005-04 | SYS005 | WEB | 2 | NET005-01, NET005-02 | — | Svr012 |
| | VM005-05 | SYS005 | WEB | 2 | NET005-01, NET005-02 | — | Svr013 |
| | VM005-06 | SYS005 | APP | 4 | NET005-02, NET005-03 | — | Svr011 |
| | VM005-07 | SYS005 | APP | 4 | NET005-02, NET005-03 | — | Svr012 |
| | VM005-08 | SYS005 | DB | 8 | NET005-03 | — | Svr011 |

| TEMPORARY SERVER ID |
|---|
| Svr014 |

FIG.52

| SYSTEM EVALUATION VALUE | VM ID | SYSTEM ID | CLASS | SIZE | IDs OF CONNECTED NETWORKS | ID OF ALLOCATION DESTINATION PHYSICAL SERVER | ID OF PRELIMINARY ALLOCATION DESTINATION PHYSICAL SERVER |
|---|---|---|---|---|---|---|---|
| 90 | VM005-01 | SYS005 | FW | 1 | NET005-01 | — | Svr011 |
| | VM005-02 | SYS005 | WEB | 2 | NET005-01, NET005-02 | — | Svr014 |
| | VM005-03 | SYS005 | WEB | 2 | NET005-01, NET005-02 | — | Svr011 |
| | VM005-04 | SYS005 | WEB | 2 | NET005-01, NET005-02 | — | Svr012 |
| | VM005-05 | SYS005 | WEB | 2 | NET005-01, NET005-03 | — | Svr013 |
| | VM005-06 | SYS005 | APP | 4 | NET005-02, NET005-03 | — | Svr011 |
| | VM005-07 | SYS005 | APP | 4 | NET005-02, NET005-03 | — | Svr012 |
| | VM005-08 | SYS005 | DB | 8 | NET005-03 | — | Svr011 |

| TEMPORARY SERVER ID |
|---|
| — |

FIG.53

| VM ID | SYSTEM ID | CLASS | SIZE | IDs OF CONNECTED NETWORKS | ID OF ALLOCATION DESTINATION PHYSICAL SERVER | ID OF PRELIMINARY ALLOCATION DESTINATION PHYSICAL SERVER |
|---|---|---|---|---|---|---|
| VM005-01 | SYS005 | FW | 1 | NET005-01 | — | Svr011 |
| VM005-02 | SYS005 | WEB | 2 | NET005-01, NET005-02 | — | Svr014 |
| VM005-03 | SYS005 | WEB | 2 | NET005-01, NET005-02 | — | Svr011 |
| VM005-04 | SYS005 | WEB | 2 | NET005-01, NET005-02 | — | Svr012 |
| VM005-05 | SYS005 | WEB | 2 | NET005-01, NET005-02 | — | Svr013 |
| VM005-06 | SYS005 | APP | 4 | NET005-02, NET005-03 | — | Svr011 |
| VM005-07 | SYS005 | APP | 4 | NET005-02, NET005-03 | — | Svr012 |
| VM005-08 | SYS005 | DB | 8 | NET005-03 | — | Svr011 |

FIG.54

METHOD AND APPARATUS FOR DETERMINING ALLOCATION DESIGN OF VIRTUAL MACHINES

CROSS-REFERENCE TO RELATED APPLICATIONS

This application is a continuing application, filed under 35 U.S.C. section 111(a), of International Application PCT/JP2011/065272, filed on Jul. 4, 2011.

FIELD

This technique relates to a technique for designing allocation of virtual machines.

BACKGROUND

In a data center in which a cloud is implemented, operation of resources is performed by virtualizing physical servers and then activating and operating plural virtual machines (VM) on physical machines.

Requests to deploy virtual machines, remove virtual machines or change the configuration of virtual machines are occasionally outputted from users to this kind of data center, and the timing of such requests and the contents of the change of the configuration cannot be predicted in advance by an administrator of the data center. The main role of the data center is to fulfill user requirements, while at the same time, improve utilization efficiency of the infrastructure used to fulfill the user requirements, and reduce offering costs such as power costs and software license fees.

The operating requirements of the data center and the operating requirements of VMs include various operating requirements such as energy-saving operation and improvement operation of fault tolerance (improvement of availability), and these operating requirements change over time to correspond to the business environment.

In a conventional technique, the operating requirements of the data center are fixedly set before development completion of the operation management system, or before starting the system operation, and dedicated programs are prepared in advance for the plural operating requirements. When a user sends a request to deploy a VM or add a VM, the VM relating to that request is additionally activated on a physical server based on the processing result of those programs.

However, due to environmental or societal demands, the priority of individual operating requirements may change, new operating requirements may be added or some existing operating requirements may be eliminated, so it may not be possible for the dedicated programs to correspond to a specific operating requirement. Therefore, a new program, which is dedicated for plural operating requirements that are changed entirely each time when changing the operating requirements, would be prepared. As the number of operating requirements increases, it becomes more difficult to find judgment conditions for those requirements, and the program itself becomes more complex. Therefore, changing the operating policy in accordance to environmental changes is not easy.

There exists a distributed computing control apparatus that is capable of improving the computational processing performance in an environment in which the system virtualization technique is used. More specifically, the distributed computing control apparatus that distributes plural second computation processes included in a first computation process among plural virtual machines that operate on one or plural physical machines has: an allocation pattern detection unit that detects various allocation patterns for distributing the plural second computation processes among the plural virtual machines, a cost computation unit that computes the cost for each allocation pattern; and an allocation unit that selects an allocation pattern that has the lowest cost based on computation results of the cost computation unit, and distributes the plural second computation processes among the plural virtual machines according to the selected allocation pattern. This technique is a technique for distributing processes among virtual machines, and changing a method for computing the cost according to the first computation process or the requesting source of that process is not disclosed.

Patent Document 1: Japanese Laid-open Patent Publication No. 2010-218307

SUMMARY

An allocation design method relating to this technique includes (A) receiving a request to allocate one or plural virtual machines for a system that includes the one or plural virtual machines to one or plural physical machines; (B) reading out first data concerning an evaluation indicator for virtual machine allocation, wherein the first data is registered in association with the system or a requesting source of the request; (C) first calculating, for each virtual machine of the one or plural virtual machines, a first cost in case where the virtual machine is allocated to any one of usable physical machines, based on the read first data to identify, for each virtual machine of the one or plural virtual machines, a physical machine for which the calculated first cost is the least; and (D) generating allocation design data including second data concerning the physical machine identified for each virtual machine of the one or plural virtual machines.

BRIEF DESCRIPTION OF DRAWINGS

FIG. 3 is a diagram depicting an example of data stored in a first management table;

FIG. 4 is a diagram depicting an example of data stored in a second management table;

FIG. 5 is a diagram depicting an example of physical server data;

FIG. 6 is a diagram depicting an example of a system management table;

FIG. 7 is a diagram depicting an example of a network management table;

FIG. 8 is a diagram depicting an example of a class management table;

FIG. 9 is a diagram depicting an example of a VM management table;

FIG. 14 is a diagram depicting an example of data stored in the network management table;

FIG. 15 is a diagram depicting an example of data stored in the class management table;

FIG. 18 is a diagram depicting physical server data in an initial state;

FIG. 25 is a diagram depicting an example of the grouping data;

FIG. 26 is a diagram depicting an example of the grouping data;

FIG. 27 is a diagram depicting an example of synthesized grouping data;

FIG. 28 is a diagram depicting an example of the physical server data;

FIG. 29 is a diagram depicting an example of the VM management table;

FIG. 30 is a diagram depicting an example of the physical server data;

FIG. 31 is a diagram depicting an example of the VM management table;

FIG. 32 is a diagram depicting an example of the VM allocation design table;

FIG. 37 is a diagram depicting an example of the VM management table;

FIG. 38 is a diagram depicting an example of a preliminary system allocation design data;

FIG. 39 is a diagram depicting an example of the VM management table;

FIG. 40 is a diagram depicting an example of temporary preliminary system allocation design data;

FIG. 47 is a diagram depicting an example of the preliminary system allocation design data;

FIG. 48 is a diagram depicting a processing flow in the third embodiment;

FIG. 49 is a diagram depicting an update example of the preliminary system allocation design data;

FIG. 50 is a diagram depicting an update example of the preliminary system allocation design data;

FIG. 51 is a diagram depicting an update example of the preliminary system allocation design data;

FIG. 52 is a diagram depicting an update example of the preliminary system allocation design data;

FIG. 53 is a diagram depicting an update example of the preliminary system allocation design data;

FIG. 54 is a diagram depicting an example of the VM allocation design data;

DESCRIPTION OF EMBODIMENTS

Embodiment 1

Figure 1:
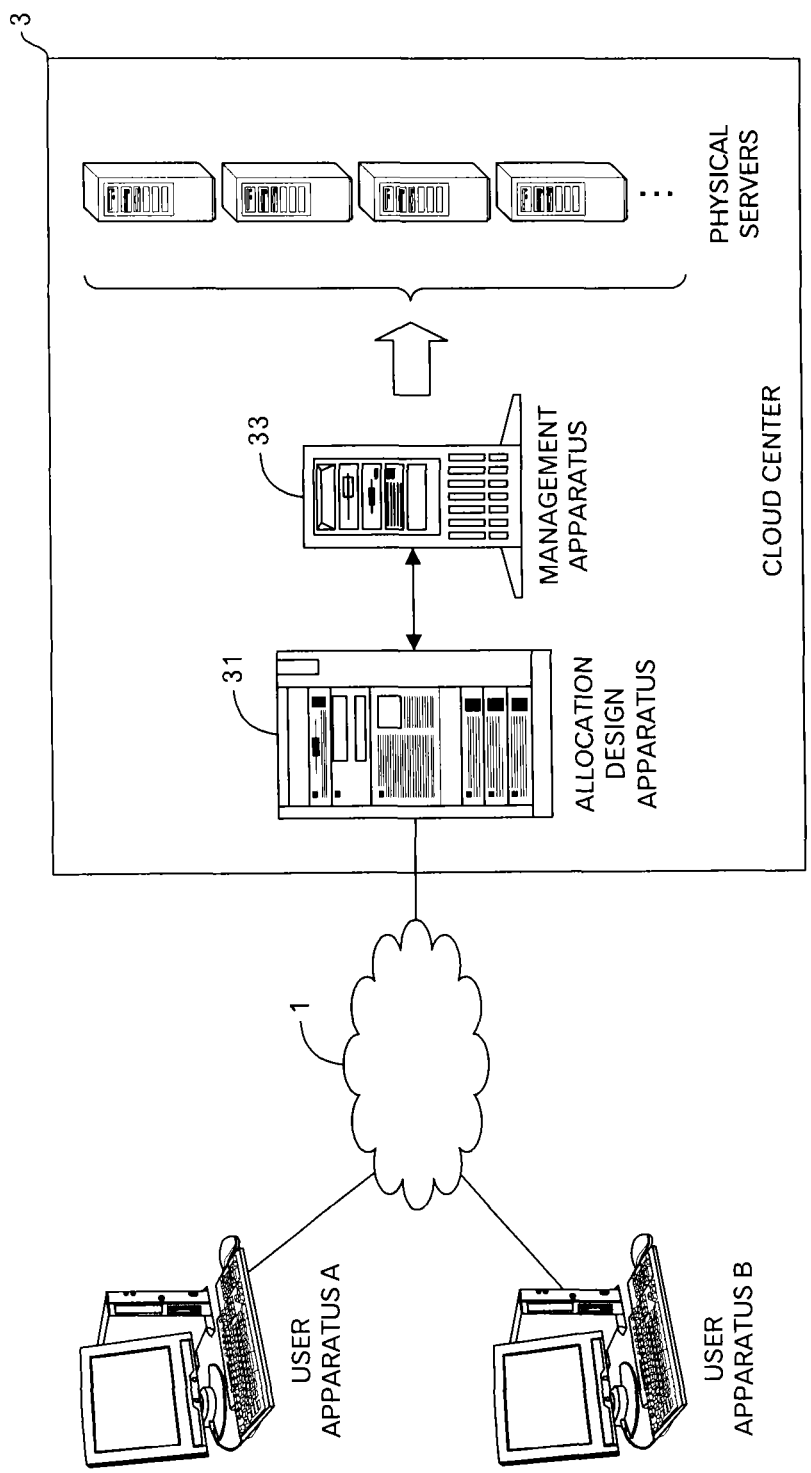
FIG. 1 is a system outline diagram relating to an embodiment of this technique.

FIG. 1 illustrates a system relating to a first embodiment of this technique. For example, plural user apparatuses (user apparatuses A and B in FIG. 1) and a cloud center 3 are connected to a network 1 such as the Internet. The user apparatus is a computer that is managed by each user, and is a computer for requesting the cloud center 3 to deploy a system that includes one or plural virtual machines, and for performing settings concerning the user itself. The cloud center 3 includes: an allocation design apparatus 31 for performing a main processing relating to this embodiment; a management apparatus 33 that performs a processing for activating virtual machines on a physical server (also called a physical machine) according to allocation design data that is generated by the allocation design apparatus 31; and plural physical servers that are managed by the management apparatus 33. In this example, the allocation design apparatus 31 and management apparatus 33 are separate, however, the same functions of the allocation design apparatus 31 and management apparatus 33 may be implemented on the same apparatus.

Figure 2:
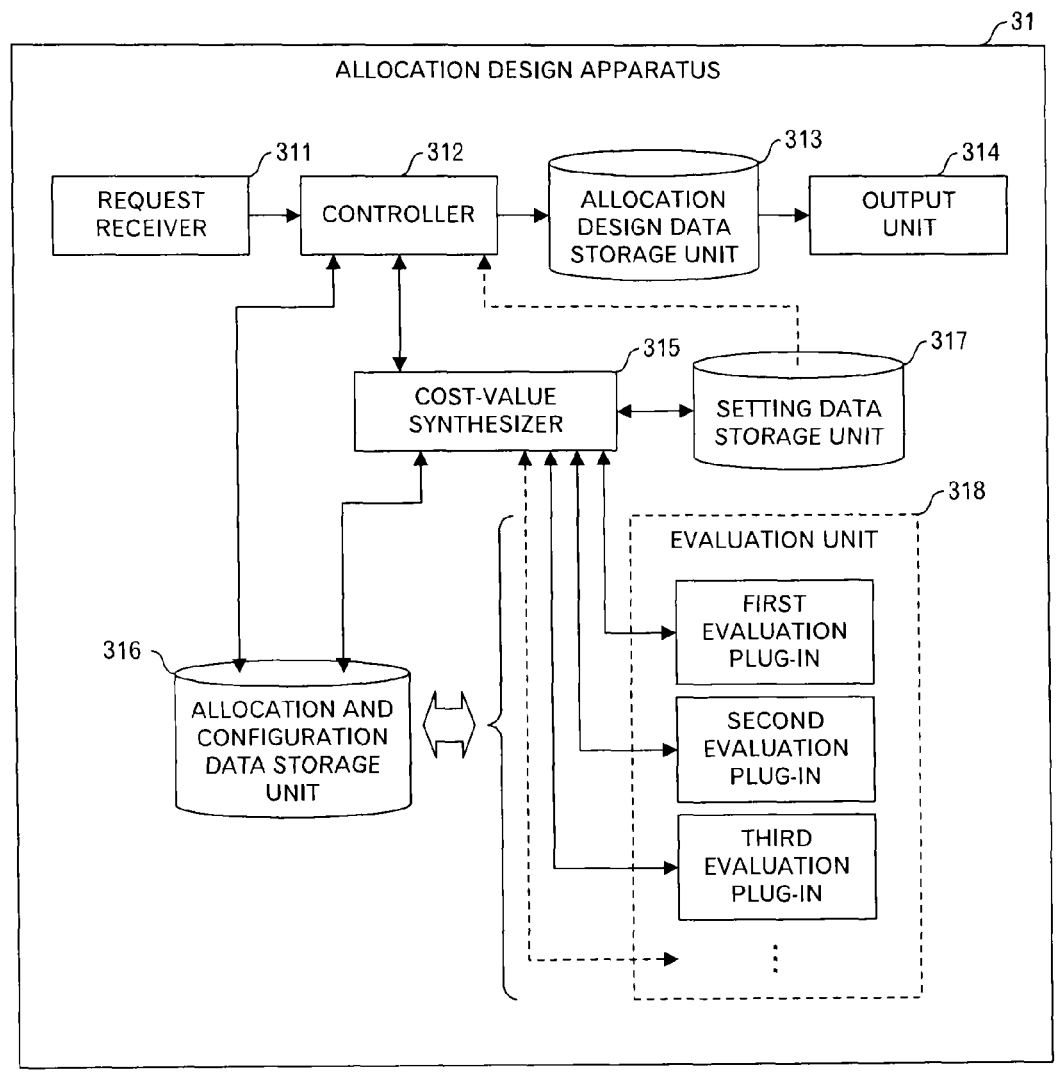
FIG. 2 is a functional block diagram of an allocation design apparatus relating to the embodiments.

Next, FIG. 2 illustrates the configuration of the allocation design apparatus 31. The allocation design apparatus 31 has a request receiver 311, a controller 312, an allocation design data storage unit 313, an output unit 314, a cost-value synthesizer 315, an allocation and configuration data storage unit 316, a setting data storage unit 317, and an evaluation unit 318. The evaluation unit 318 has n evaluation plug-ins, each of which independently evaluates an evaluation indicator, of which it is in charge, to calculate a unified cost value. FIG. 2 illustrates three evaluation plug-ins, however, n is an arbitrary integer. Depending on changes in the business environment or the like, individual plug-ins are added, deleted or replaced. In addition, changing the judgment or determination contents for one evaluation indicator is achieved by changing one evaluation plug-in.

When receiving a VM allocation request from a user apparatus, the request receiver 311 outputs that VM allocation request to the controller 312. The controller 312 performs control of the allocation design apparatus 31. More specifically, the controller 312 performs a processing in response to the VM allocation request, and stores the processing result in the allocation and configuration data storage unit 316. The controller 312 also requests the cost-value synthesizer 315 to perform a processing, and receives processing results from the cost-value synthesizer 315. The controller 312 generates allocation design data based on processing results, and stores the generated data in the allocation design data storage unit 313. The output unit 314 outputs the allocation design data that is stored in the allocation design data storage unit 313 to the management apparatus 33, for example. The management apparatus 33 performs a processing to activate a designated virtual machine on a designated physical server according to the received allocation design data. The allocation design data may be transmitted to the user apparatus that is the requesting source in order to check that data.

The cost-value synthesizer 315 uses data that is stored in the setting data storage unit 317 and the allocation and configuration data storage unit 316 to perform a processing in cooperation with the evaluation unit 318, and outputs the processing result to the controller 312. In the evaluation unit 318, each of the evaluation plug-ins that are designated by the cost-value synthesizer 315 performs a processing for calculating the cost for the evaluation indicator, of which it is in charge.

FIG. 3 illustrates an example of a first management table that is data stored in the setting data storage unit 317. The first management table is a table to manage evaluation plug-ins that exist in the allocation design apparatus 31. In the example in FIG. 3, for each evaluation plug-in, an identifier (ID) of an evaluation plug-in, a name of an evaluation plug-in and a synthesis coefficient (in other words, weighting value) are included in this table. The synthesis coefficient in FIG. 3 is a default value, and whether or not this value is used may be set for each user or system. The name of the evaluation plug-in represents the evaluation indicator (also called the requirement).

Furthermore, FIG. 4 illustrates an example of a second management table that is data stored in the setting data storage unit 317. The second management table is a table to specify, for each system that is deployed in the cloud center 3, the evaluation plug-ins that are to be applied, and the synthesis coefficient for the cost that is calculated by that evaluation plug-in. In the example in FIG. 4, a system identifier (ID) and applied evaluation plug-in data are registered for each system. The applied evaluation plug-in data is "default" when the first management table illustrated in FIG. 3, for example, is used as is, and in the case in which settings are performed separately, the applied evaluation plug-in data represents that setting data. Setting data is applied by overriding the first management table in FIG. 3, and includes a pair of an evaluation plug-in to be applied, and a synthesis coefficient. For example, in the case of a system having system ID "SYS003", setting is performed so that synthesis coefficient "10" is used for the evaluation plug-in having ID "PI-0", synthesis coefficient "1" is used for the evaluation plug-in having ID "PI-1", synthesis coefficient "1" is used for the evaluation plug-in having ID "PI-3", and synthesis coefficient "5" is used for the evaluation plug-in having ID "PI-7". Other evaluation plug-ins are not used for the system having system ID "SYS003".

For example, from a user apparatus, a user is able to designate evaluation plug-ins to be used from among plural evaluation plug-ins that are stored in advance in the allocation design apparatus 31 for the user's own system that is deployed in the cloud center 3.

In the following, an evaluation plug-in for availability (first evaluation plug-in), an evaluation plug-in for power (second evaluation plug-in), and an evaluation plug-in for network utilization (third evaluation plug-in) will be explained in detail as examples for this embodiment. In actuality, logic is prepared for other evaluation plug-ins as well according to evaluation policies for the respective evaluation indicators.

FIG. 5 illustrates an example of physical server data that is stored in the allocation and configuration data storage unit 316. In the example in FIG. 5, a physical server identifier (ID), specifications (that are converted in unit size), maximum number of virtual machines that can be allocated, connection switch identifier (ID), identifiers (IDs) of allocated virtual machines, identifier (ID) of preliminarily-allocated virtual machine, and power-supply state are registered for each physical server. The physical server ID is an ID of a physical server that can be used in the cloud center 3. As for the specifications, for example, the result of converting a physical server having a 4-GB main memory and a certain type of CPU (Central Processing Unit), which is operated at a frequency of 1 GHz, to a physical server having a size "1" as a processing capability. More specifically, a physical server having a size "2" is a physical server having an 8-GB main memory and a certain type of CPU, which is operated at a frequency of 2 GHz.

In this embodiment, the processing capability is similarly specified for virtual machines to be deployed. In other words, as for a virtual machine having a processing capability of size "1", the virtual machine can be deployed on a physical server having the processing capability of size "1" or greater. In this embodiment, more simply, an example in which the size such as size "S", "M", "L" or "LL" is designated is explained. When size "S" is designated, a virtual machine having size "1" is deployed. When size "M" is designated, a virtual machine having size "2" is deployed. When size "L" is designated, a virtual machine having size "4" is deployed. More specifically, this is a virtual machine having a processing capability such as a physical server having a 16-GB main memory and a certain type of CPU (including a 2-core CPU) operated at 2 GHz. When size "LL" is designated, a virtual machine having size "8" is deployed. More specifically, this is a virtual machine having a processing capability such as a physical server having a 32-GB main memory and a certain type of CPU (including a 4-core CPU) operated at 2 GHz.

FIG. 6 illustrates an example of a system management table that is data stored in the allocation and configuration data storage unit 316. In the example in FIG. 6, a system identifier (ID), identifiers (IDs) of virtual machines that are included in the system, and network identifiers (NET IDs) of networks included in the system are registered for each system that is deployed in the cloud center 3.

FIG. 7 illustrates an example of a network management table that is data stored in the allocation and configuration data storage unit 316. In the example in FIG. 7, a system ID, network IDs (NET IDs) of networks that are included in that system, and IDs of virtual machines that are related to each network are registered for each system. With this data, it is possible to know which networks are in each system, and what virtual machines are connected.

FIG. 8 illustrates an example of a class management table that is data stored in the allocation and configuration data storage unit 316. In the example in FIG. 8, a system ID, the function types (called classes) of the virtual machines those are included in that system, and the IDs of the virtual machines that belong to each class are registered for each system. Here, FW represents a firewall, WEB represents a Web server, APP represents an application server, DB represents a DB server, and APP/DB represents a server that functions as both an application server and DB server.

FIG. 9 illustrates an example of a VM management table that is data stored in the allocation and configuration data storage unit 316. In the example in FIG. 9, a virtual machine ID, a system ID, a class, a size, network IDs of connected networks, an ID of an allocation destination physical server, and an ID of a preliminary allocation destination physical server are registered for each virtual machine.

Figure 10:
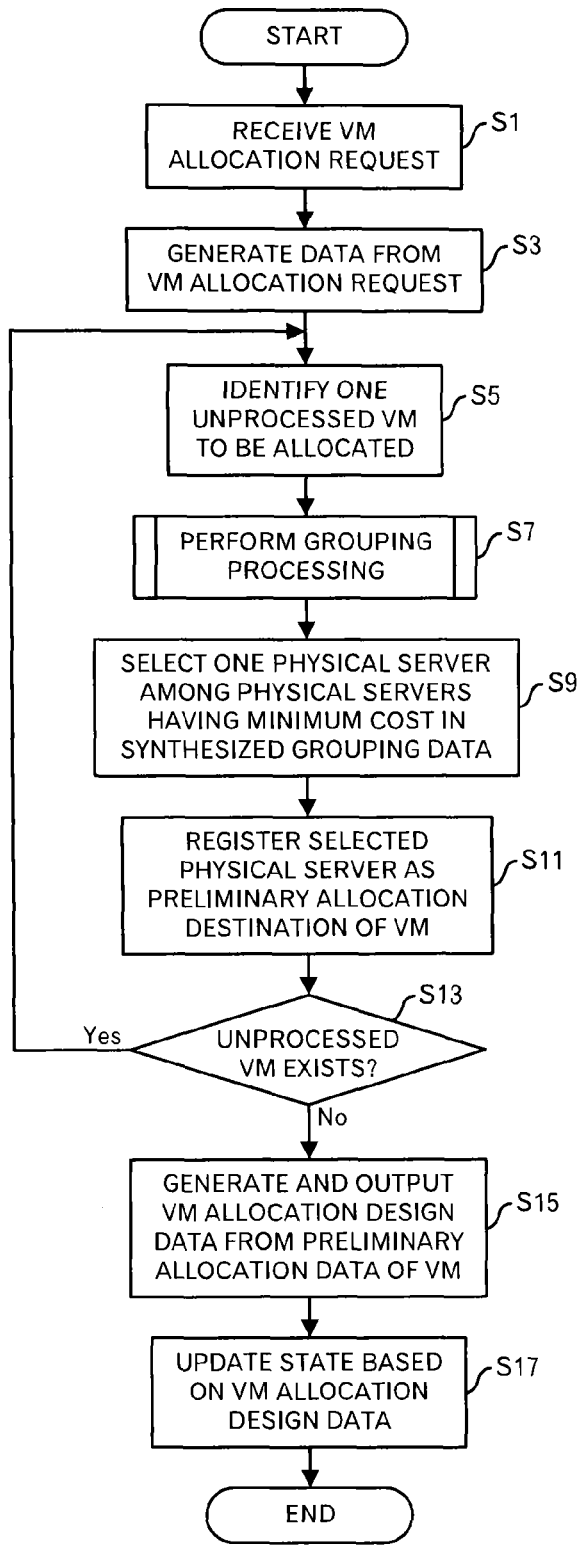
FIG. 10 is a diagram depicting a processing flow for a first embodiment.
Figures 11, 12, 13:
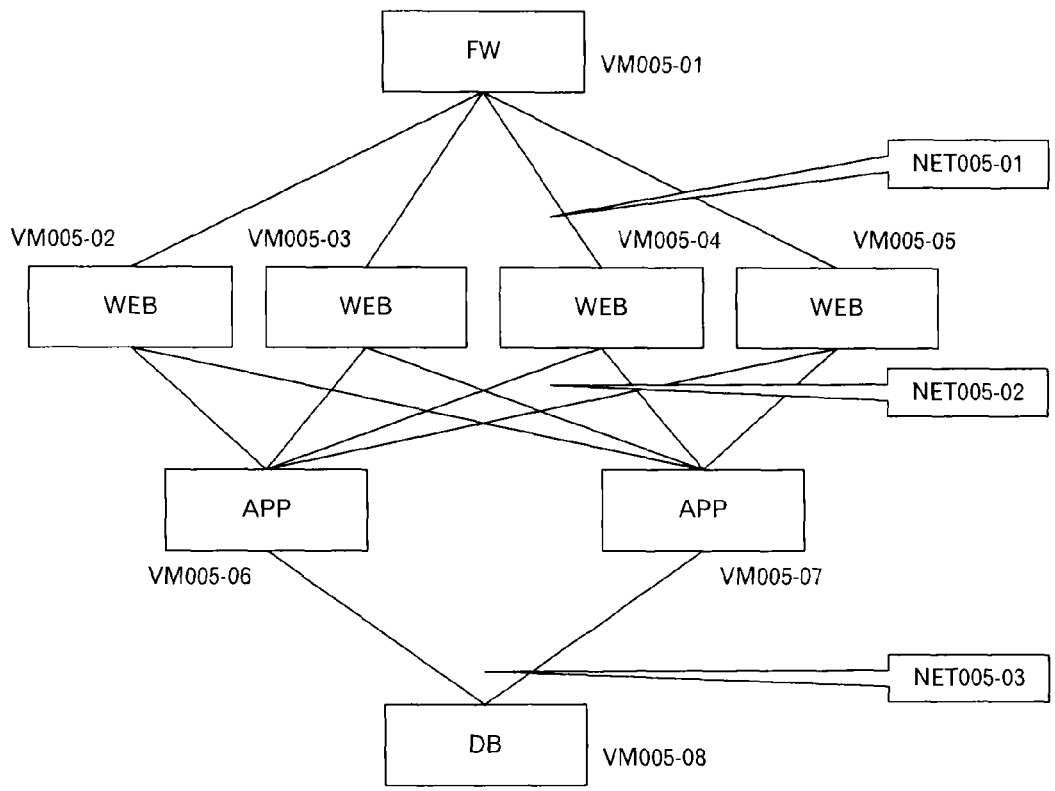
FIG. 11 is a diagram depicting an example of a system to be built.
FIG. 12 is a diagram depicting an example of evaluation plug-in data to be registered in the second management table.
FIG. 13 is a diagram depicting an example of data stored in the system management tale.

Next, FIG. 10 to FIG. 32 will be used to explain the processing that is performed by the system in FIG. 1. For example, when the user apparatus A transmits a VM allocation request to the cloud center 3, the request receiver 311 of the allocation design apparatus 31 in the cloud center 3 receives that VM allocation request and outputs the request to the controller 312 (FIG. 10: step S1). In this embodiment, the VM allocation request includes a system ID of the system to be built, data for the virtual machines to be activated, and data for the networks to be set between the virtual machines. For example, it is assumed that a system such as illustrated in FIG. 11 will be built. In FIG. 11, a system having a system ID "SYS005" includes one FW-class virtual machine, four WEB-class virtual machines, two APP-class virtual machines and one DB-class virtual machine. The network ID of the network between the FW-class virtual machine and the WEB-class virtual machines is "NET005-01", the network ID of the network between the WEB-class virtual machines and the APP-class virtual machines is "NET005-02", and the network ID of the network between the APP-class virtual machines and the DB-class virtual machine is "NET005-03". Furthermore, it is assumed that the size of class FW is "S", the size of class WEB is "M", the size of class APP is "L" and the size of class DB is "LL". In this way, data for the virtual machines includes the number, size and IDs of the virtual machines of each class. Moreover, the data for the networks includes the network IDs to be set between classes or between virtual machines.

The data of the evaluation plug-in for the system "SYS005" related to the VM allocation request may be set in advance in the allocation design apparatus 31, or may be transmitted together with the VM allocation request. In this example, data such as illustrated in FIG. 12 is stored in the second management table (setting data storage unit 317) as the data of the evaluation plug-in for the system "SYS005". In the example in FIG. 12, setting is performed only for the evaluation plug-in IDs "PI-0", "PI-1" and "PI-7", so only these three evaluation plug-ins are used. Synthesis coefficient values are also set in the same way and used.

Next, the controller 312 generates data to be stored in the allocation and configuration data storage unit 316 from the received VM allocation request, and stores the generated data (step S3). More specifically, the controller 312 generates data of the system management table (FIG. 13) and data of the network management table (FIG. 14) and class management table (FIG. 15), and stores the generated data. These data can be generated from the VM allocation request described above.

The controller 312 identifies one unprocessed virtual machine of the virtual machines to be allocated (step S5). For example, the controller 312 may select, for example, a virtual machine in order of the lesser identifier, or may select a virtual machine at random. The controller 312 then causes the cost-value synthesizer 315 and evaluation unit 318 to perform a grouping processing for the identified virtual machine (step S7). This grouping processing will be explained using FIG. 16 to FIG. 27.

Figure 16:
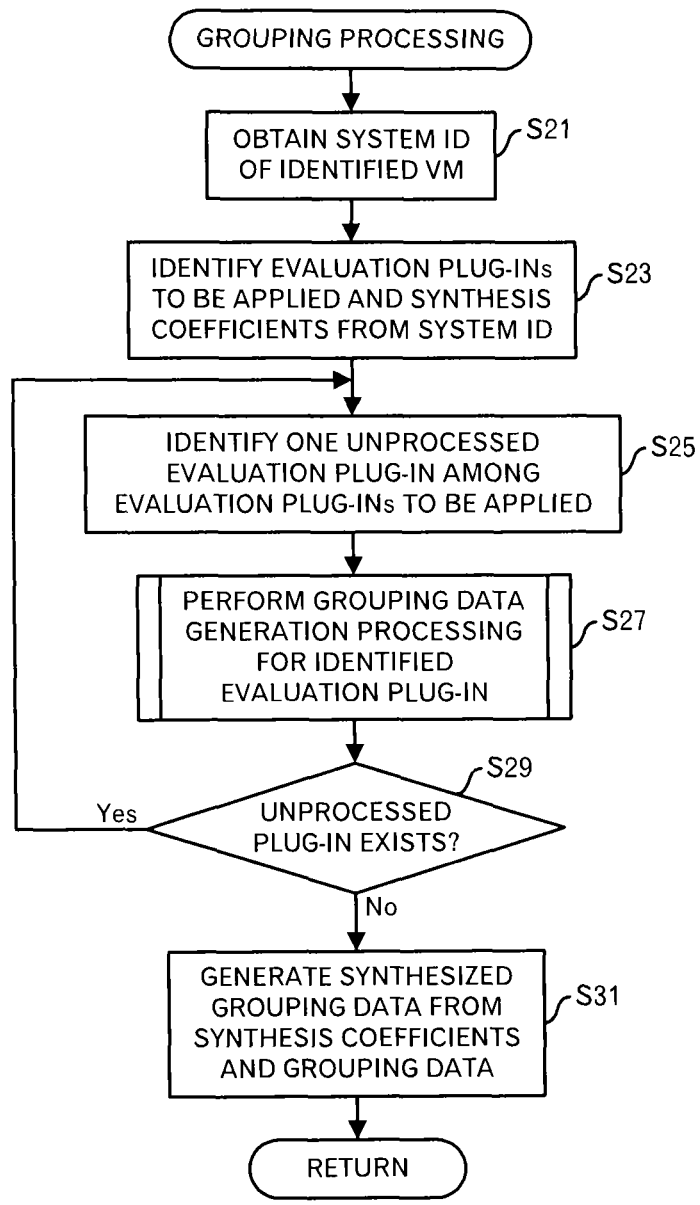
FIG. 16 is a diagram depicting a processing flow of a grouping processing.

The cost-value synthesizer 315 acquires the system ID of the identified virtual machine from the system management table or the like that is stored in the allocation and configuration data storage unit 316, for example (FIG. 16: step S21). The cost-value synthesizer 315 then identifies the evaluation plug-ins to be applied and the synthesis coefficients from the acquired system ID (step S23). The cost-value synthesizer 315 reads data that is correlated with the system ID from the second management table. When the default is designated, the cost-value synthesizer 315 reads the first management table. In the case of the example in FIG. 12, first to third evaluation plug-ins are identified, and a synthesis coefficient is identified for each of the plug-ins.

After that, the cost-value synthesizer 315 identifies an unprocessed evaluation plug-in from among the evaluation plug-ins to be applied (step S25). The cost-value synthesizer 315 then causes the identified evaluation plug-in to perform a grouping data generation processing (step S27). The identified evaluation plug-in performs a grouping data generation processing in response to an instruction from the cost-value synthesizer 315. The grouping data generation processing will be explained using FIG. 17 to FIG. 26. The content of the grouping data generation processing differs according to the evaluation plug-in, however the basic processing structure is the same.

Figure 17:
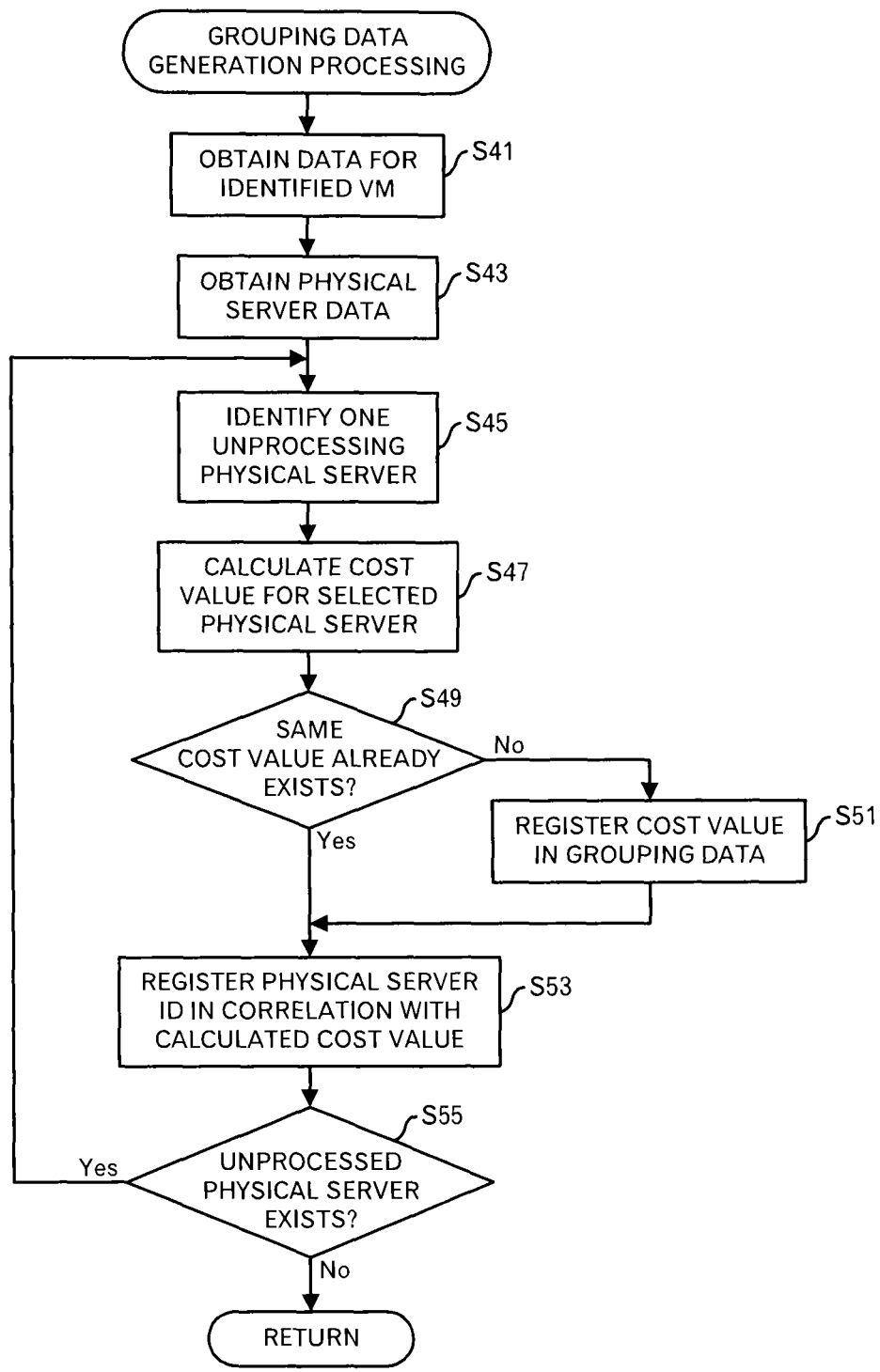
FIG. 17 is a diagram depicting a processing flow of a grouping data generation processing.

The evaluation plug-in reads data (such as the system management table, network management table and class management table) for the identified virtual machine from the allocation and configuration data storage unit 316 (FIG. 17: step S41). The evaluation plug-in also reads physical server data from the allocation and configuration data storage unit 316 (step S43). For example, an initial state such as illustrated in FIG. 18 is assumed. In other words, FIG. 18 illustrates physical server data representing a state in which no physical machine is activated.

The evaluation plug-in then identifies one unprocessed physical server from the physical server data (step S45). The evaluation plug-in identifies only a physical server that can be allocated depending on the remaining allocatable size and the size of the virtual machines to be allocated. After that, the evaluation plug-in calculates the cost value of the difference for the selected physical server (step S47). At this step, a different processing is performed by each evaluation plug-in.

For example, the first evaluation plug-in for the availability performs a processing such as described below. In other word, presuming the case in which the virtual machine that was identified at the step S5 is allocated to the physical server that was identified at the step S45, the first evaluation plug-in counts the number of virtual machines n that have the same system ID and same class as the virtual machine that was identified at the step S5. Then, the first evaluation plug-in calculates the cost value=$p*(n-1)^2$ (in case of n=1), or the cost value=$p*((n-1)^2-(n-2)^2)$ (in case of n>1). Here, p is a coefficient such as 30. When many virtual machines having the same system ID and same class are allocated to the same physical server, it is presumed that the cost is the square of the number of virtual machines n. This takes into account the cost value of damages that includes the amount of the influence when any trouble occurs in the physical server and it is not possible to use the virtual machines that are allocated to that physical server.

In the case of a state such as illustrated in FIG. 18, n=1 is obtained when the first virtual machine is allocated to any physical server, so the cost value="0".

Moreover, the second evaluation plug-in for the power performs a processing such as described below. In other words, when the power-supply state of the physical server that was identified at the step S45 is "ON", or when the virtual machine is registered in the physical sever data as the ID of the preliminarily-allocated virtual machine, the cost value="0", and for all other cases, the cost value is set to "10". When the power supply of the physical server is newly turned "ON", or when another physical server in which other virtual machines are not allocated is used, the cost value for the power is presumed to be "10".

Furthermore, the third evaluation plug-in for the network utilization, for example, performs a processing as described below. In other words, when the virtual machine that was identified at the step S5 is allocated to the physical server that was identified at the step S45, the third evaluation plug-in counts, in the physical server data, the number of increased virtual machines, which have the same system ID, same network ID and different class from that virtual machine, and are already allocated or preliminarily allocated to the physical server in the following three viewpoints. More specifically, the third evaluation plug-in counts the number of increased virtual machines that are already allocated or preliminarily allocated to the same physical server as C0, counts the number of increased virtual machines that are already allocated or preliminarily allocated to another physical server that is connected to a switch having the same connection switch ID as C1, and counts the number of increased virtual machines that are already allocated or preliminarily allocated to a physical server that is connected to a switch having a different connection switch ID as C2.

Then, the third evaluation plug-in calculates the cost by an expression "C0*a+C1*b+C2*c". Here, a, b and c are coefficients; for example, a=1, b=2 and c=30. However, the coefficients may be changed such as a=0, b=1 and c=20.

In this way, when a virtual machine is allocated to a physical server that is connected to a different switch, the amount of physical network utilization becomes high, so the cost becomes high.

Figure 19:
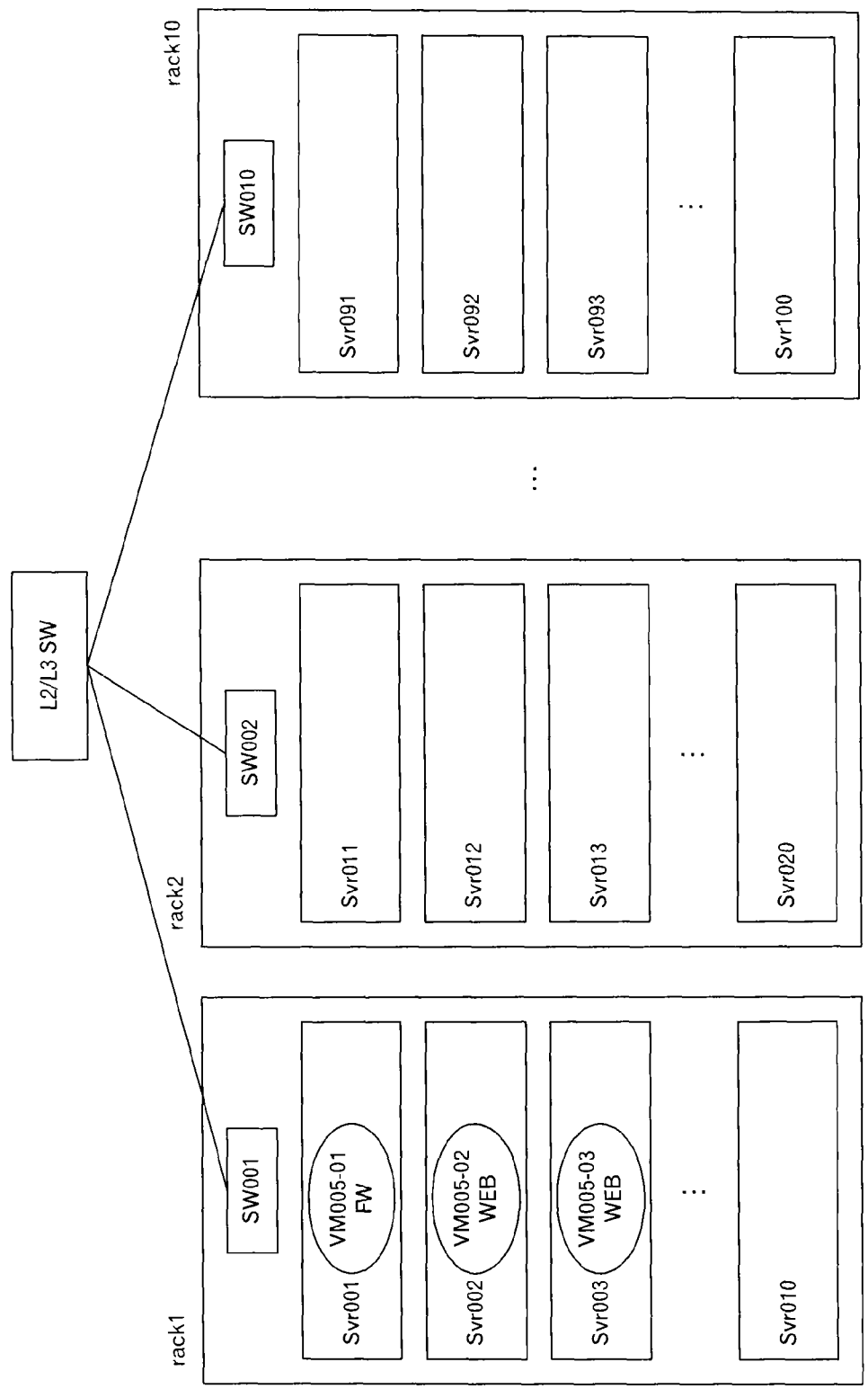
FIG. 19 is a diagram to explain calculation of a cost value for the network utilization.

For example, the physical server data described above represents hardware configuration such as in FIG. 19. In other words, physical servers Svr001 to Svr010 are allocated in rack rack1, and these physical servers are connected to switch SW001. Similarly, physical servers Svr011 to Svr020 are allocated in rack rack2, and these physical servers are connected to switch SW002. Physical servers Svr091 to Svr100 are allocated in rack rack10, and these physical servers are connected to switch SW010. Switches SW001 to SW010 are connected to L2 switch or L3 switch or to a router.

Figure 20:
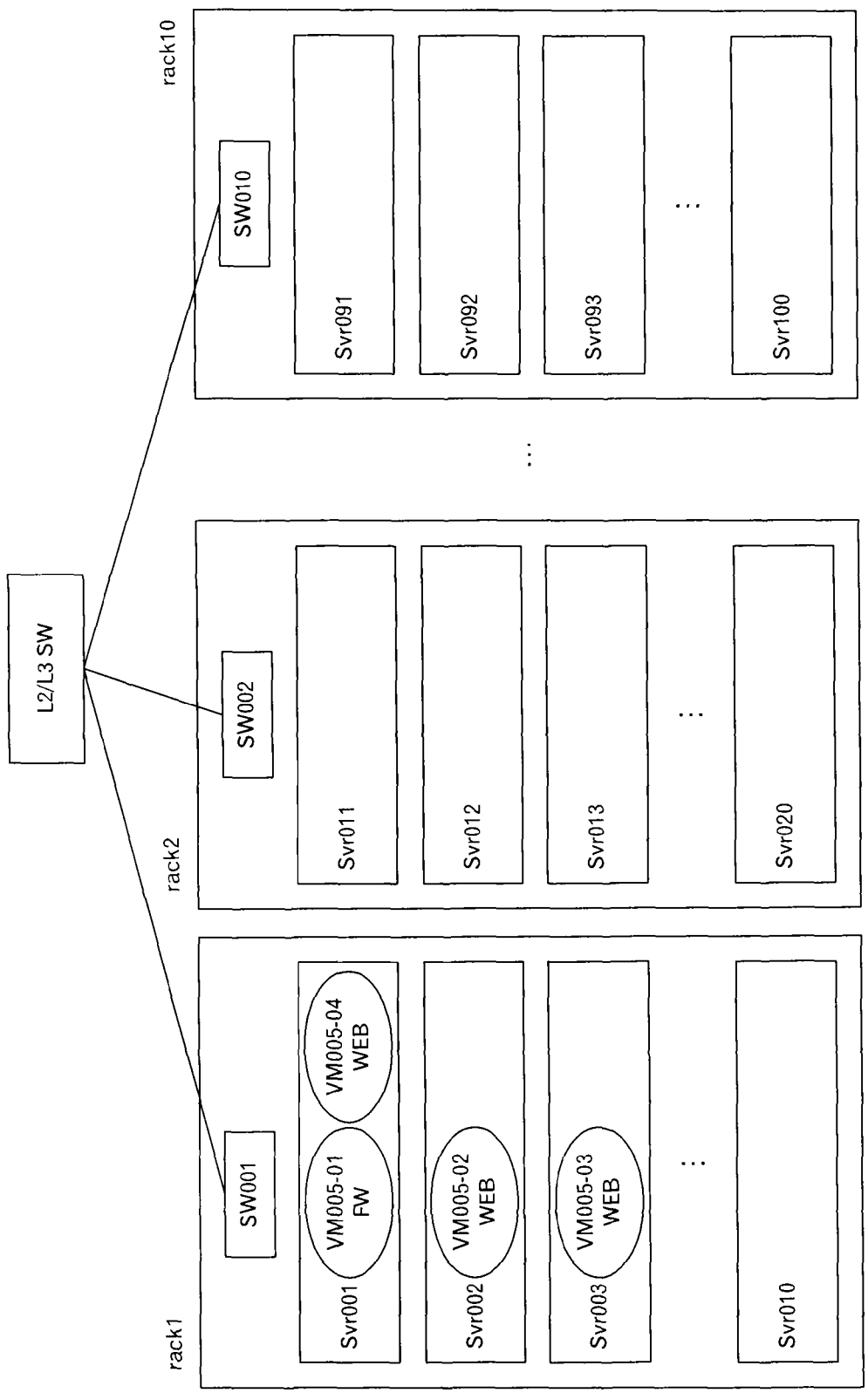
FIG. 20 is a diagram to explain the calculation of the cost value for the network utilization.

As illustrated in FIG. 19, it is presumed that class-FW virtual machine VM005-01 is preliminarily allocated to the physical server Svr001, class-WEB virtual machine VM005-02 is preliminarily allocated to the physical server Svr2002, and class-WEB virtual machine VM005-03 is preliminarily allocated to the physical server Svr003. In this state, allocating class-WEB virtual machine VM005-04 is considered. As illustrated in FIG. 20, when trying to allocate a class-WEB virtual machine VM005-04 to the physical server Svr001, there already exists the virtual machine VM005-01 having the same system ID, and same network ID but belonging to different class, so C0=1 is obtained. Only virtual machines having the same class are preliminarily allocated to the physical servers Svr002 and Svr003, so C1=0 is obtained. There is no virtual machine allocated to a physical server that is connected to a different switch, so C2=0 is obtained. Therefore, the cost value becomes 1(=C0)*1=1.

Figure 21:
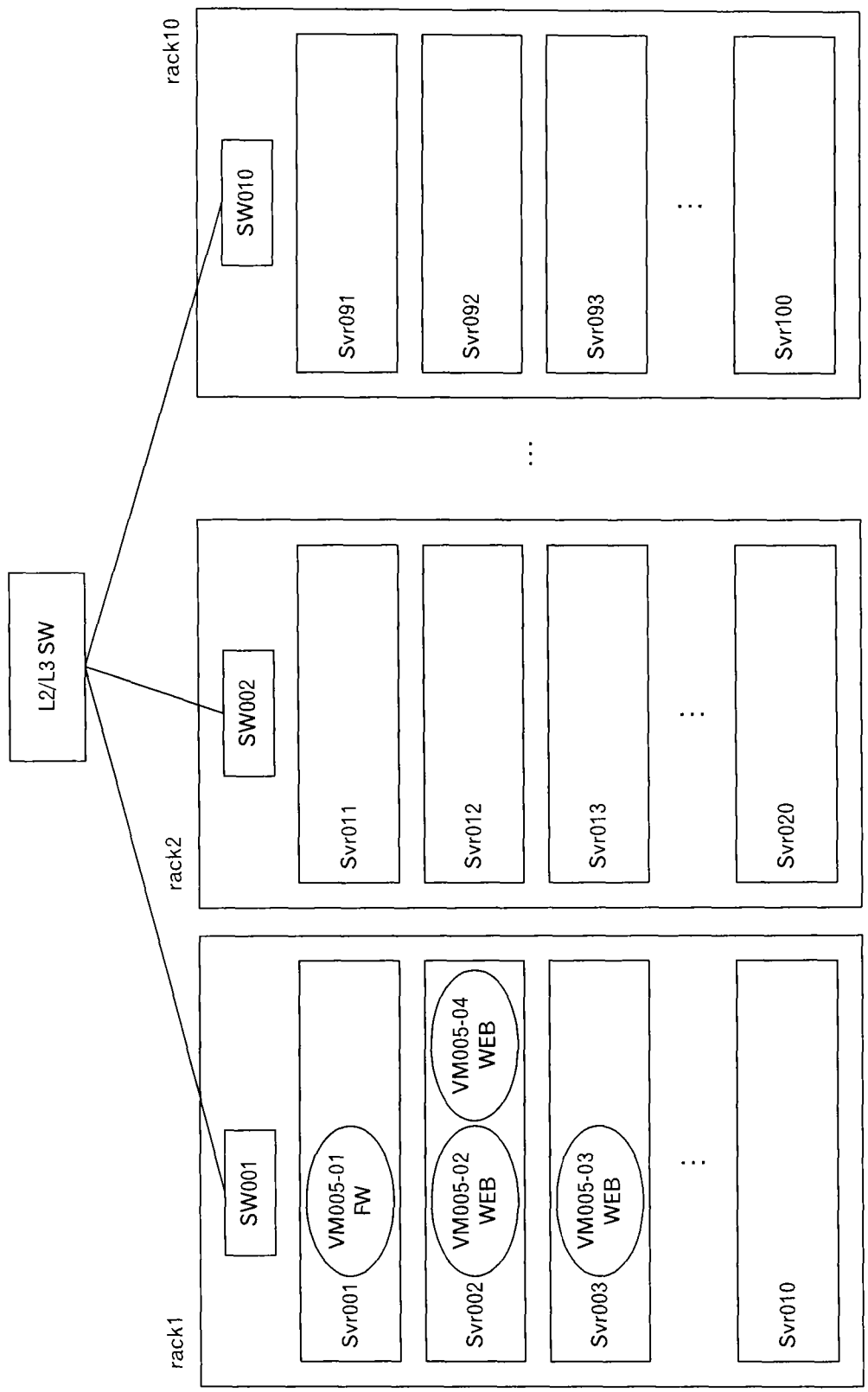
FIG. 21 is a diagram to explain the calculation of the cost value for the network utilization.

Furthermore, as illustrated in FIG. 21, when trying to allocate a class-WEB virtual machine VM005-04 to the physical server Svr002, only a virtual machine having the same class is preliminarily allocated to the physical server Svr002, so C0=0 is obtained. On the other hand, virtual machines having the same system ID, same network ID but belonging to a different class exist in the different physical server Svr001 having the same switch ID, so C1=1 is obtained. No virtual machines are allocated to physical servers that are connected to different switches, so C2=0 is obtained. Therefore, the cost value becomes 1 (=C1)*2=2.

Figure 22:
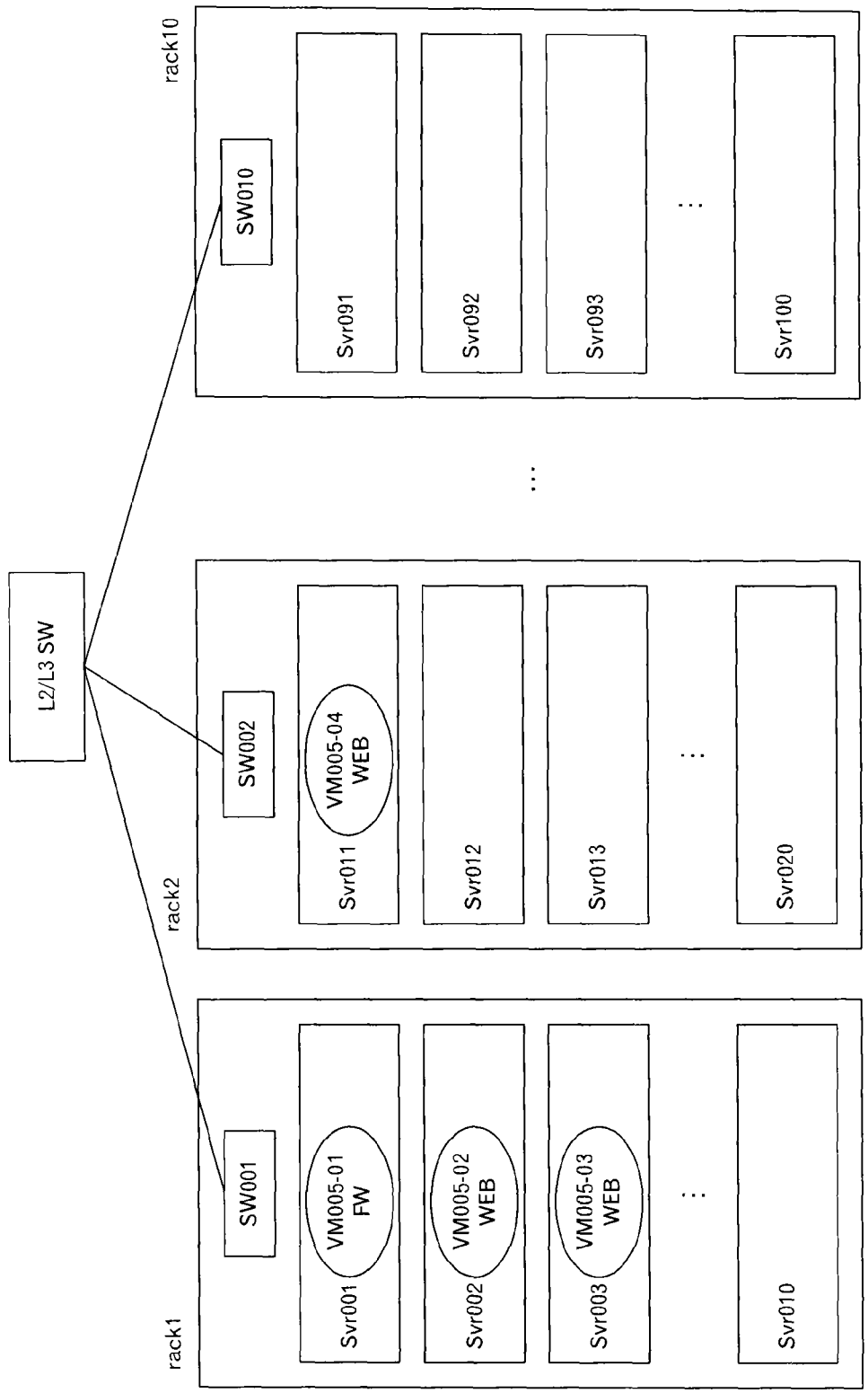
FIG. 22 is a diagram to explain the calculation of the cost value for the network utilization.

Moreover, as illustrated in FIG. 22, when trying to allocate class-WEB virtual machine VM005-04 to the physical server Svr011, there is no other virtual machine in a physical server having the same switch ID, so C0=C1=0 is obtained. On the other hand, there exists a virtual machine VM005-01 having the same network ID but belonging to a different class in the physical server Svr001 having a different switch ID, so C2=1 is obtained. Therefore, the cost value becomes 1(=C2)*30=30.

Figures 23, 24:
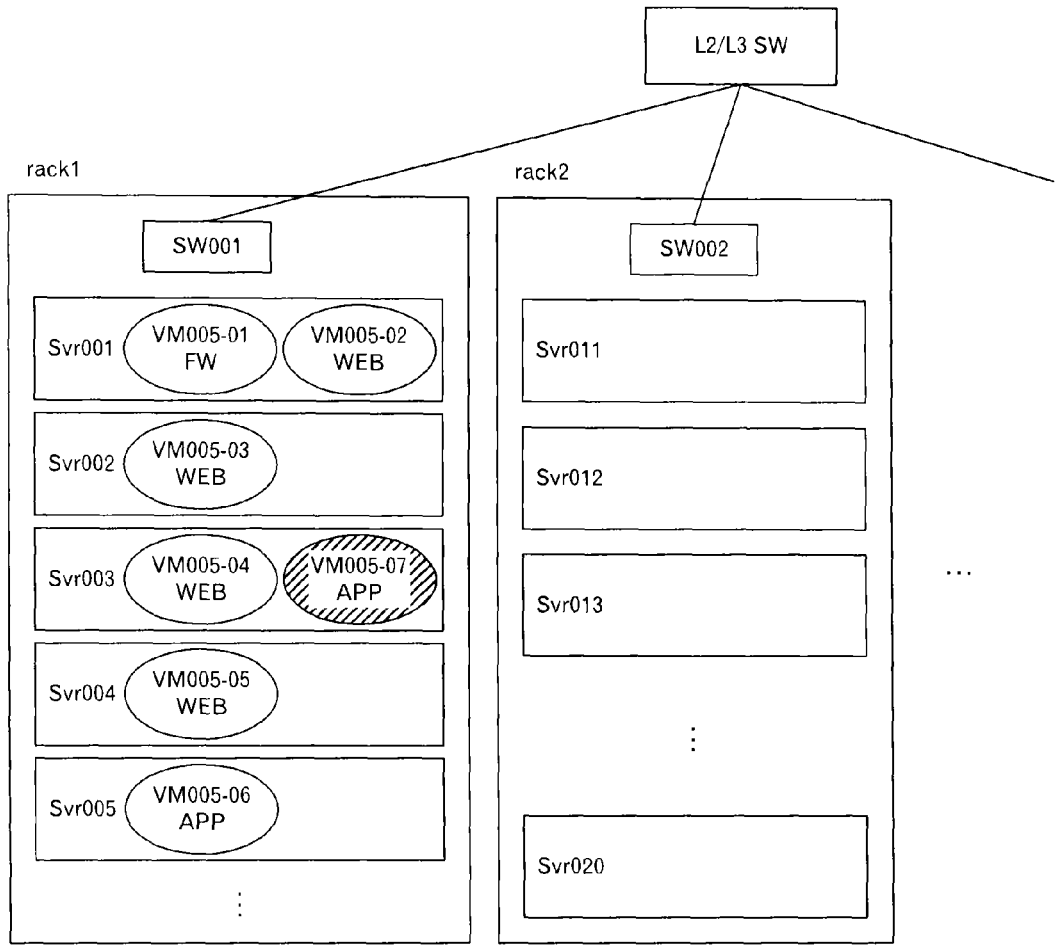
FIG. 23 is a diagram depicting an example of data stored in the system management table.
FIG. 24 is a diagram depicting an example of the grouping data.

Furthermore, as illustrated in FIG. 23, in a state where virtual machines VM005-01 to VM005-06 are preliminarily allocated, and when trying to allocate class-APP virtual machine VM005-07 to the physical server Svr003, the virtual machines are counted as follows. The virtual machine that satisfies the requirement that the network ID be the same as that of class-APP virtual machine VM005-07 is a class-WEB virtual machine. A class-FW virtual machine is a virtual machine having a different network ID. Therefore, since there is only one virtual machine having the same network ID but belonging to a different class in the same physical server, C0=1 is obtained. On the other hand, the virtual machines that have the same network ID and belong to a different class in a different physical servers having the same switch ID are virtual machines VM005-02, VM005-03 and VM005-05, so C1=3 is obtained. There is no virtual machine that is to be allocated to a physical server having a different switch ID, so C2=0 is obtained. In other words, the cost value becomes 1*1+2*3=7.

In the case of the network configuration illustrated in FIG. 11, as for classes WEB and APP, there are plural different classes that satisfy the requirement of having the same switch ID, so care is required.

Returning to the explanation of the processing in FIG. 17, the evaluation plug-in determines whether the same cost value already exists in the grouping data (step S49). When there is no same cost value, the evaluation plug-in registers the cost value in the grouping data (step S51). After that, the processing moves to step S53. On the other hand, when the same cost value exists in the grouping data, the processing moves to step S53.

After that, the evaluation plug-in registers the physical server ID that was identified at the step S45 in correlation with the calculated cost value (step S53).

The grouping data is data such as illustrated in FIG. 24 to FIG. 26. FIG. 24 illustrates an example of grouping data generated by the first evaluation plug-in for the availability. In this way, the ID of the corresponding physical server is registered for each cost value. Similarly, FIG. 25 illustrates an example of grouping data generated by the second evaluation plug-in for the power. Furthermore, FIG. 26 illustrates an example of grouping data generated by the third evaluation plug-in for the network utilization. From this, a cost value for each evaluation indicator is calculated independently for each physical server that has a possibility that it is used, and the cost values are obtained as the grouping data.

After that, the evaluation plug-in determines whether there is an unprocessed physical server (step S55). When there is an unprocessed physical server, the processing returns to the step S45. However, when there is no unprocessed physical server, the evaluation plug-in outputs the generated grouping data to the cost-value synthesizer 315. Then, the processing returns to the processing of the calling source.

Returning to the explanation of the processing in FIG. 16, the cost-value synthesizer 315 determines whether there is an unprocessed evaluation plug-in (step S29). When there is an unprocessed evaluation plug-in, the processing returns to the step S25. On the other hand, when there is no unprocessed evaluation plug-in, the grouping data such as illustrated in FIG. 24 to FIG. 26 in the example above has been obtained.

After that, the cost-value synthesizer 315 generates synthesized grouping data from the synthesis coefficients that were identified at the step S23 and the grouping data that was obtained at the step S27 (step S31). For each of the physical servers included in the grouping data described above, calculation is performed by reading out the cost values and adding the read cost values after weighting with the synthesis coefficients. The processing then returns to the calling source processing.

For example, in the case of the physical server Svr001, the cost value=30 for the first evaluation plug-in, the cost value=0 for the second evaluation plug-in and the cost value=0 for the third evaluation plug-in are obtained, so the synthesized cost value can be calculated as 30*1 (=synthesis coefficient for the first evaluation plug-in)+0*2 (=synthesis coefficient for the second evaluation plug-in)+0*1 (=synthesis coefficient for the third evaluation plug-in)=30. Similarly, in the case of the physical server Svr003, the cost value=0 for the first evaluation plug-in, the cost value=10 for the second evaluation plug-in and the cost value=1 for the third evaluation plug-in are obtained, so the synthesized cost value can be calculated as 0*1+10*2+1*1=21.

By performing this kind of processing, the synthesized grouping data such as illustrated in FIG. 27 is generated. In FIG. 27 as well, the IDs for the corresponding physical servers are registered for each cost value. By obtaining this kind of data, it is possible to identify a physical server group having the lowest cost value when allocating the virtual machine that was identified at the step S5. This kind of generated synthesized grouping data is outputted to the controller 312 from the cost-value synthesizer 315.

Returning to the explanation of the processing in FIG. 10, the controller 312 selects, from the synthesized grouping data that was received from the cost-value synthesizer 315, one physical server according to a predetermined rule from among a group of physical servers having the lowest cost value (step S9). For example, the physical server having the least remaining allocatable size may be selected from the physical server data, or on the other hand, the physical server having the greatest remaining allocatable size may be selected. Moreover, a physical server may be selected at random from among a group of physical servers having the lowest cost value. Furthermore, one physical server may be selected according to other aspects.

After that, the controller 312 registers the ID of the selected physical server in the physical server data that is stored in the allocation and configuration data storage unit 316 as the preliminary allocation destination of the virtual machine that was identified at the step S5, and similarly registers that ID in the VM management table (step S11).

For example, the grouping data such as illustrated in FIG. 24 to FIG. 26, and synthesized grouping data such as illustrated in FIG. 27 are based on the premise of the physical server data such as illustrated in FIG. 28 and a VM management table such as illustrated in FIG. 29 (expresses a state in which the virtual machines VM005-01 to VM005-03 are already preliminarily allocated). As a result, the physical server Svr003 is selected for the virtual machine VM005-04, the virtual machine VM005-04 is registered as the ID of the preliminarily-allocated virtual machine for the physical server Svr003 in the physical server data as illustrated in FIG. 30, and the physical server Svr003 is registered for the virtual machine VM005-04 in the VM management table as illustrated in FIG. 31.

Then, the controller 312 determines whether there is an unprocessed virtual machine (step S13). When there is an unprocessed virtual machine, the processing returns to the step S5. However, when there is no unprocessed virtual machine, the controller 312 generates VM allocation design data from the preliminary allocation data of the virtual machines in the VM management table or physical server data, and stores the generated data in the allocation design data storage unit 313 (step S15). For example, the controller 312 generates the VM allocation design data such as illustrated in FIG. 32. In the example in FIG. 32, a virtual machine ID, system ID, class, size, network ID of connected network, and physical server ID of the determined allocation destination are registered for each virtual machine. However, when a virtual machine and a physical server ID of the determined allocation destination are correlated, there is no need to include the other elements. The output unit 314 outputs this kind of VM allocation design data to the management apparatus 33.

By preparing the VM allocation design data such as above, the management apparatus 33 is able to properly activate a virtual machine on a designated physical server.

For example, in the case of automatically activating a virtual machine, in response to an allocation completion notification from the management apparatus 33, the controller 312 updates the state of the VM management table and physical server data in the allocation and configuration data storage unit 316 according to the VM allocation design data related to the allocation completion notification (step S17). More specifically, the controller 312 reregisters the virtual machine ID that is registered in the column of the ID of the preliminarily-allocated virtual machine in the column of the ID of the allocated virtual machine.

By performing the processing such as described above, physical servers are flexibly evaluated for each user or system, and according to the synthesized cost values that are based on the evaluation results, the design data for properly allocating virtual machines to physical servers is obtained.

An example of newly deploying a system was explained above, however, it is also possible to handle adding a virtual machine to a system by the similar processing.

Embodiment 2

Next, a second embodiment of this technique will be explained. In the first embodiment, virtual machines to be allocated were determined in order of identifiers of the virtual machines or at random, however, depending on the selection order of the virtual machines, the synthesized cost value may change. Therefore, this kind of problem is handled in this embodiment.

Figures 33A, 33B, 34:
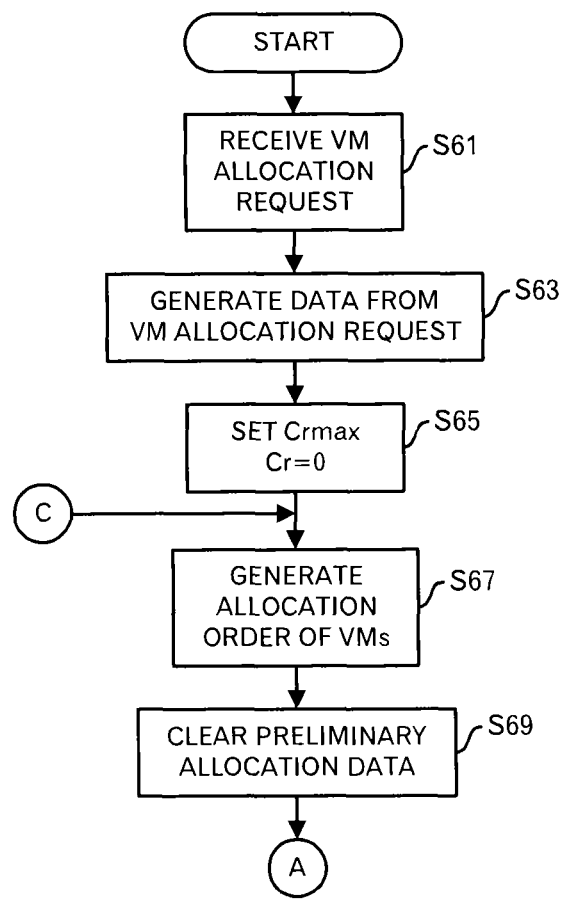
FIG. 33A is a diagram depicting an example of the designated number of physical machines.
FIG. 33B is a diagram depicting an example of a timeout time.
FIG. 34 is a diagram depicting a processing flow in a second embodiment.

The system configuration is mostly the same as that of the first embodiment. The difference is that data for the designated number of times (e.g. 10 times), which is the upper limit of repetition times or the timeout time (e.g. 10 seconds) such as illustrated in FIG. 33B, is stored in the setting data storage unit 317, so the controller 312 accesses the setting data storage unit 317. In FIG. 2, the dotted line represents this access.

The processing by the system in this second embodiment will be explained using FIG. 34 to FIG. 44.

For example, when a user apparatus A transmits a VM allocation request to the cloud center 3, the request receiver 311 of the allocation design apparatus 31 in the cloud center 3 receives that VM allocation request, and outputs that request to the controller 312 (FIG. 34: step S61). In this embodiment as well, the case is presumed in which a VM allocation request is received to allocate a virtual machine of a system such as explained in the first embodiment to any one of physical servers.

Next, the controller 312 generates data that is to be stored in the allocation and configuration data storage unit 316 from the received VM allocation request, and stores the generated data (step S63). As in the first embodiment, the controller 312 generates and stores data for the system management table (FIG. 13), network management table (FIG. 14) and class management table (FIG. 15). These data can be generated from the VM allocation request described above.

The controller 312 also reads the upper limit of the number of repetition times, which is stored in the setting data storage unit 317, and sets "the read upper limit" to Crmax, and sets "0" to a repetition counter Cr (step S65).

The controller 312 also generates one virtual machine allocation order (step S67). For example, the order may be generated such that the virtual machine identifiers are arranged at random, or may be generated such that in one order, the turn of a virtual machine is replaced to generate another order.

In a specific example, it is assumed that first the order of VM005-01, VM005-02, VM005-03, VM005-04, VM005-05, VM005-06, VM005-07 and VM005-08 is generated, and then the order of VM005-06, VM005-07, VM005-03, VM005-04, VM005-05, VM005-02, VM005-01 and VM005-08 is generated.

The controller 312 then clears the physical server data in the allocation and configuration data storage unit 316 and the preliminary allocation data in the VM management table (step S69). Here, the processing moves to the processing in FIG. 35 by way of terminal A.

Figure 35:
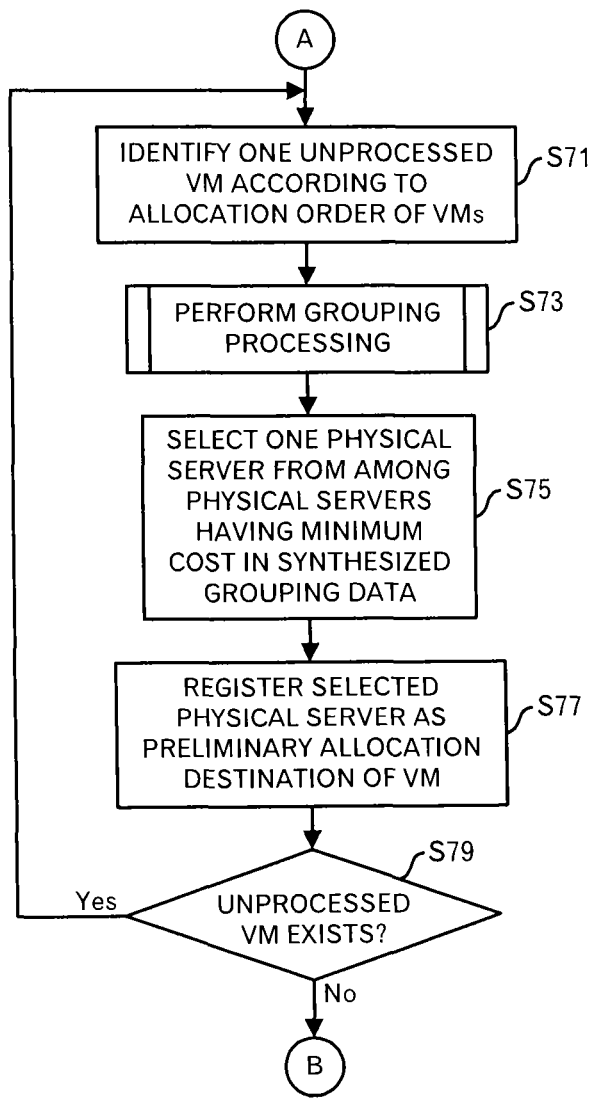
FIG. 35 is a diagram depicting a processing flow in the second embodiment.

Moving to an explanation of the processing in FIG. 35, the controller 312 identifies one unprocessed virtual machine according to the allocation order of the virtual machine, which was generated at the step S67 (step S71). Then, the controller 312 causes the cost-value synthesizer 315 and the evaluation unit 318 to perform a grouping processing for the identified virtual machine (step S73). The grouping process is the same as that in the first embodiment, so no further explanation will be given. As a result, the synthesized grouping data is generated.

The controller 312 then receives the synthesized grouping data from the cost-value synthesizer 315, and selects one physical server according to a predetermined rule from among a group of physical servers having the lowest cost value based on the synthesized grouping data (step S75). For example, in the physical server data, the physical server having the least remaining allocatable size may be selected, or conversely, the physical server having the greatest remaining allocatable size may be selected. A physical server may be selected at random from among a group of physical servers having the lowest cost value. Furthermore, one physical server may be selected according to another aspect.

After that, together with registering the ID of the selected physical server as the preliminary allocation destination of the virtual machine, which was specified at the step S71, in the physical server data stored in the allocation and configuration data storage unit 316, the controller 312 similarly registers the ID in the VM management table (step S77).

The controller 312 then determines whether there is an unprocessed virtual machine in the order of the virtual machine allocation, which was generated at the step S67 (step S79). When there is an unprocessed virtual machine, the processing returns to the step S71. However, when there is no unprocessed virtual machine, the processing returns to the processing in FIG. 36 by way of terminal B.

Figure 36:
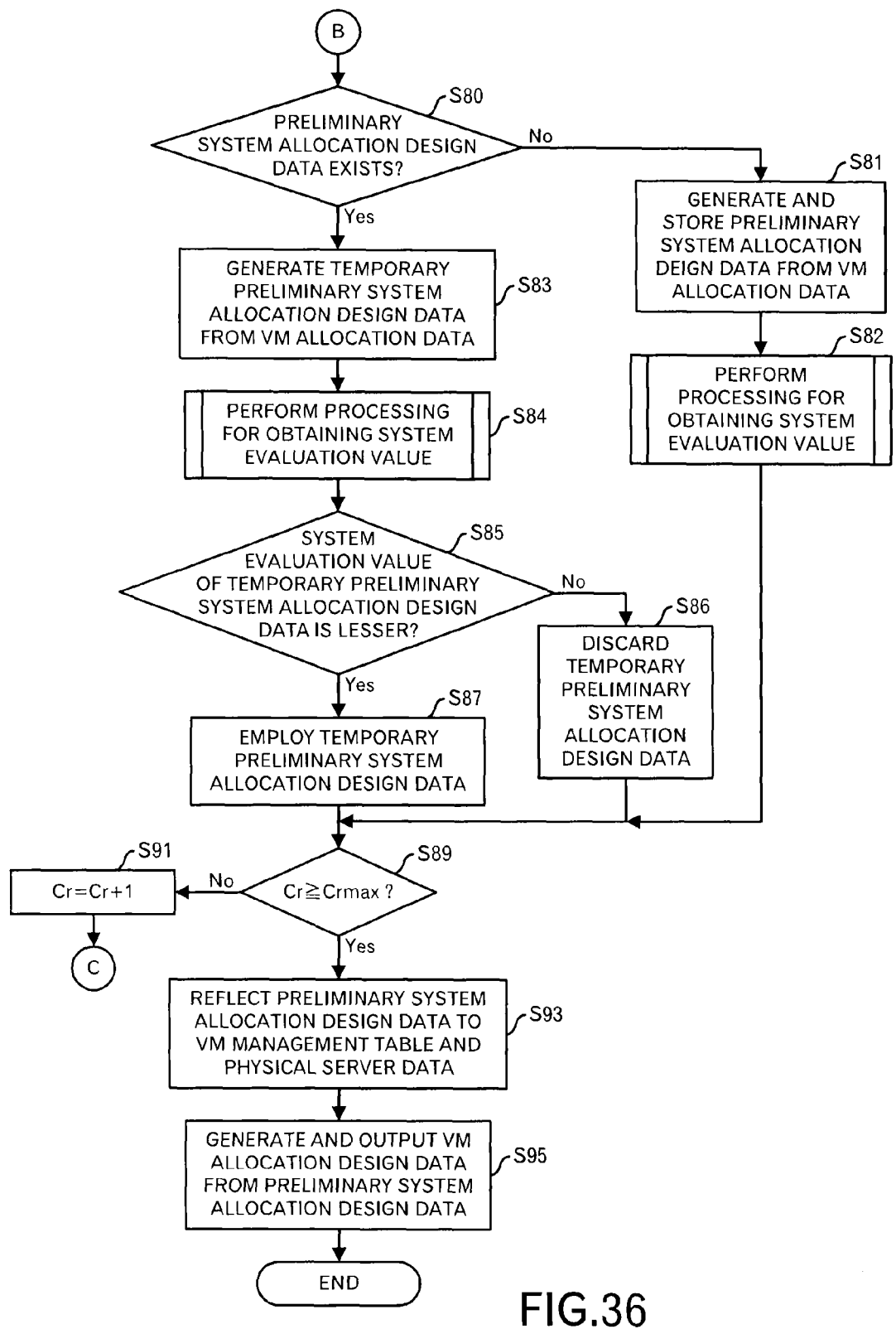
FIG. 36 is a diagram depicting a processing flow in the second embodiment.

Moving to an explanation of the processing in FIG. 36, the controller 312 determines whether there is already preliminary system allocation design data in the allocation and configuration data storage unit 316 (step S80). When preliminary allocation is performed the first time for a virtual machine related to the virtual machine allocation request, there is no preliminary system allocation design data, so the controller 312 generates preliminary system allocation design data from VM allocation data relating to this preliminary allocation in the VM management table or physical server data in the allocation and configuration data storage unit 316, and stores the generated data in the allocation and configuration data storage unit 316 (step S81).

The controller 312 then causes the cost-value synthesizer 315 to perform a processing for obtaining a system evaluation value for the preliminary system allocation design data (step S82). The processing for obtaining a system evaluation value will be explained using FIG. 41 to FIG. 44. The system evaluation value that is obtained by performing this processing is returned to the controller 312 from the cost-value synthesizer 315, and the controller 312 adds the returned value to the preliminary system allocation design data. The processing then moves to step S89.

For example, after a VM management table such as illustrated in FIG. 37 is generated at the step S77, preliminary system allocation design data such as illustrated in FIG. 38 is generated. In the example in FIG. 38, the data includes a system evaluation value, and includes, for each virtual machine, a virtual machine identifier, system ID, class, size, ID of a connected network, ID of an allocation destination physical server, and ID of a preliminary-allocation destination physical server. There are cases in which a system ID, class, size and ID of the connected network are not included.

On the other hand, when there is already preliminary system allocation design data, the controller 312 generates temporary preliminary system allocation design data from the VM allocation data relating to the preliminary allocation in the VM management table or physical server data in the allocation and configuration data storage unit 316, and stores the generated data in the allocation and configuration data storage unit 316 (step S83). For example, when there is preliminary system allocation design data such as in FIG. 38, then when a VM manage table such as in FIG. 39 is obtained this time, the temporary preliminary system allocation design data such as illustrated in FIG. 40 is generated.

The controller 312 then causes the cost-value synthesizer 315 to perform a processing for obtaining a system evaluation value for the temporary preliminary system allocation design data (step S84). The processing for obtaining a system evaluation value will be explained using FIG. 41 to FIG. 44. The system evaluation value that is obtained by performing this processing is returned to the controller 312 from the cost-value synthesizer 315, and the controller 312 adds the returned value to the temporary preliminary system allocation design data. The processing then moves to step S85.

The controller 312 then compares the system evaluation value of the preliminary system allocation design data and the system evaluation value of the temporary preliminary system allocation design data, and determines whether the system evaluation value of the temporary preliminary system allocation design data is lesser (step S85). When the system evaluation value of the temporary preliminary system allocation design data is equal to or greater than the system evaluation value of the preliminary system allocation design data, the controller 312 deletes the temporary preliminary system allocation design data (step S86), and then the processing moves to the step S89.

On the other hand, when the system evaluation value of the temporary preliminary system allocation design data is lesser, the controller 312 replaces the preliminary system allocation design data with the temporary preliminary system allocation design data in order to employ the temporary preliminary system allocation design data (step S87). The processing then moves to the step S89.

After that, the controller 312 determines whether Cr has become equal to or greater than Crmax (step S89). When Cr is less than Crmax, the controller 312 increments Cr by "1" (step S91), after which the processing returns to the step S67 in FIG. 34 by way of terminal C.

However, when Cr has become equal to or greater than Crmax, the controller 312 reflects the preliminary system allocation design data on the VM management table and physical server data in the allocation and configuration data storage unit 316 (step S93). In other words, the controller 312 updates data of the IDs of the preliminarily-allocated virtual machines. After that, the controller 312 generates VM allocation design data from the preliminary system allocation design data, and stores the generated data in the allocation design data storage unit 313 (step S95). For example, the controller 312 generates VM allocation design data such as illustrated in FIG. 32. The output unit 314 outputs this kind of VM allocation design data to the management apparatus 33.

By preparing this kind of VM allocation design data, the management apparatus 33 is able to properly activate virtual machines on a designated physical server.

For example, in the case of automatically activating virtual machines, the controller 312 updates the state of the VM management table and physical server data in the allocation and configuration data storage unit 316 according to the VM allocation design data related to an allocation completion notification, based on the allocation completion notification from the management apparatus 33. More specifically, the controller 312 reregisters the virtual machine ID that is registered in the column of the ID of the preliminarily-allocated virtual machine in the column of the ID of the allocated virtual machine.

By performing the processing such as described above, evaluation is flexibly performed for a physical server for each user or system, and design data for properly allocating virtual machines to the physical server is obtained according to the synthesized cost value that is based on the evaluation result. Differing from the first embodiment, the allocation order of the virtual machines is considered, so it becomes possible to allocate the virtual machine having a low cost value for requirements to be considered for a user or system.

An example of newly deploying a system was explained above, however, the addition of a virtual machine to a certain system can also be handled with the similar processing.

Furthermore, an example of the processing that limits the number of repetitions was given above, however, as illustrated in FIG. 33B, the number of repetitions may be limited by the timeout time. In the case of using the timeout time, the time is measured from the step S65.

Next, the processing for obtaining the system evaluation value will be explained using FIG. 41 to FIG. 44.

The cost-value synthesizer 315 acquires the system ID of the virtual machine to be processed, from the preliminary system allocation design data that is stored in the allocation and configuration data storage unit 316 or temporary preliminary system allocation design data (step S141). The cost-value synthesizer 315 then identifies the evaluation plug-ins and synthesis coefficients to be used from the acquired system ID (step S143). The cost-value synthesizer 315 reads data that is correlated to the system ID from the second management table. When the default is designated, the cost-value synthesizer 315 reads the first management table. In the case of the example in FIG. 12, the first to the third evaluation plug-ins are identified, and synthesis coefficients are identified for each plug-in.

The cost-value synthesizer 315 then identifies one unprocessed evaluation plug-in (step S145). After that, the cost-value synthesizer 315 causes the identified evaluation plug-in to perform a processing for calculating a system evaluation value (step S147).

Figure 42:
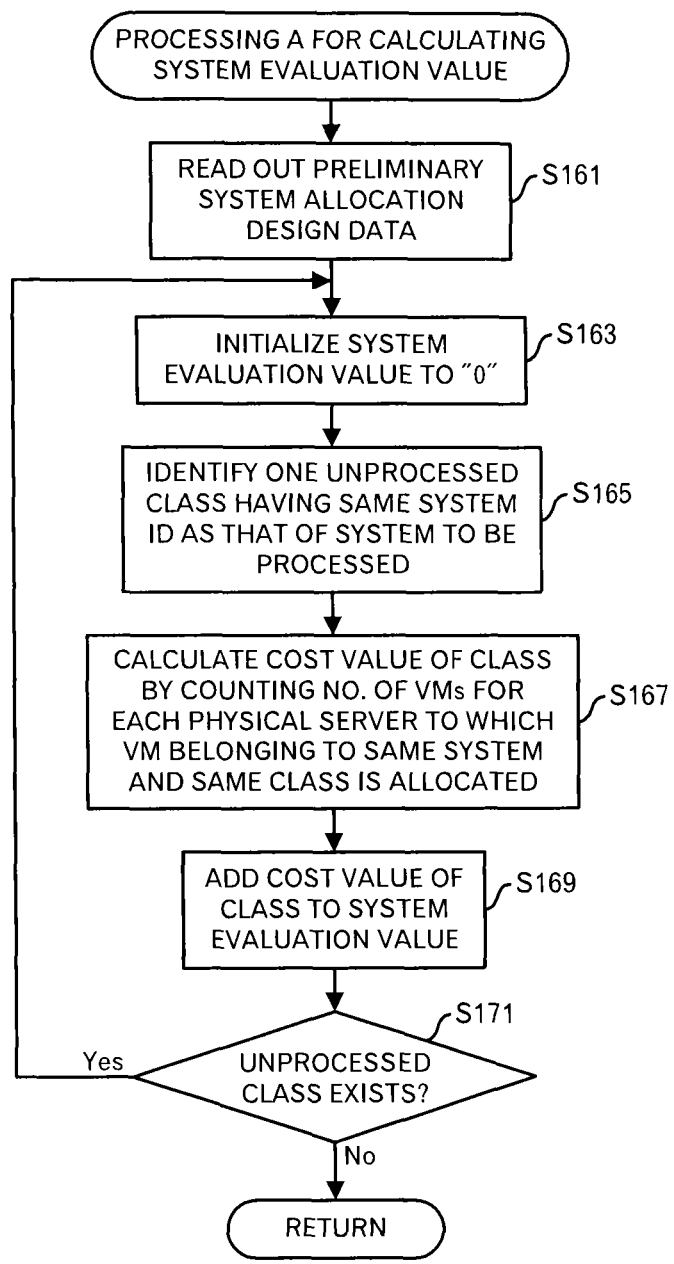
FIG. 42 is a diagram depicting a processing flow of a processing for calculating a system evaluation value by an evaluation plug-in for availability.

For example, FIG. 42 will be used to explain the processing A for calculating the system evaluation value in the case where the evaluation plug-in for the availability is invoked.

First, the first evaluation plug-in reads the preliminary system allocation design data or temporary preliminary system allocation design data for the system to be processed from the allocation and configuration data storage unit 316 (step S161). The first evaluation plug-in then initializes the system evaluation value to "0" (step S163).

After that, the first evaluation plug-in identifies one unprocessed class having the same system ID as the system to be processed in the preliminary system allocation design data (step S165). Then, the first evaluation plug-in counts the number of virtual machines n for each physical server to which virtual machines that belong to the same system and same class are allocated, and calculates the cost value of this class according to the equation in the following (step S167). More specifically, the first evaluation plug-in calculates the cost value by $p*(n-1)^2$. Here, p is a coefficient such as 30. The consideration for this equation is the same as that explained in the first embodiment. For example, when there are two virtual machines allocated to Svr001 and three virtual machines are allocated to Svr002, the cost value is calculated as $30*(2-1)^2+30*(3-1)^2=150$.

After that, the first evaluation plug-in calculates the total cost value for all classes by adding the cost value for the class to the system evaluation value (step S169). The first evaluation plug-in then determines whether there is an unprocessed class (step S171). When there is an unprocessed class, the processing returns to the step S165. On the other hand, when there is no unprocessed class, the first evaluation plug-in outputs the system evaluation value, which is the total cost value, to the cost-value synthesizer 315, after which the processing returns to the processing of the calling source.

Figure 43:
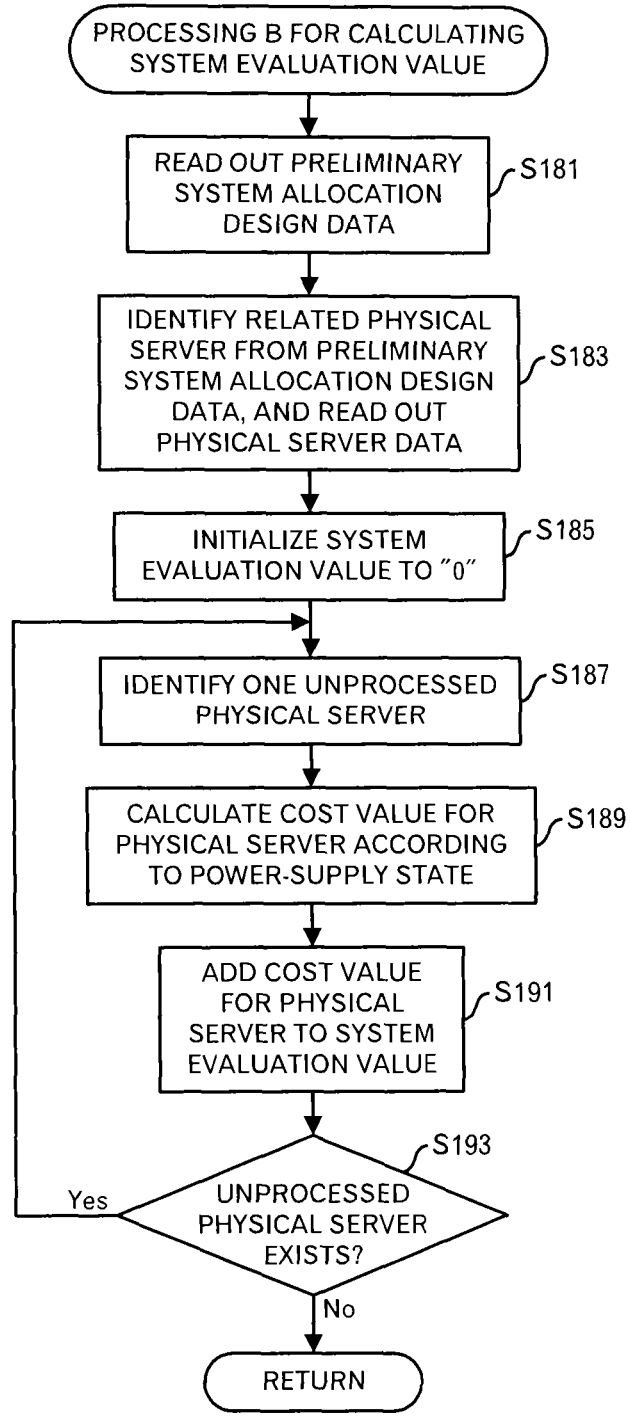
FIG. 43 is a diagram depicting a processing flow of the processing for calculating the system evaluation value by an evaluation plug-in for power.

The processing B for calculating the system evaluation value for the case in which the evaluation plug-in for the power was invoked will be explained using FIG. 43.

The second evaluation plug-in reads the preliminary system allocation design data or temporary preliminary system allocation design data from the allocation and configuration data storage unit 316 (step S181). After that, the second evaluation plug-in identifies the related physical server from the preliminary system allocation design data or temporary preliminary system allocation design data, and then reads the data of that physical server from the physical server data in the allocation and configuration data storage unit 316 (step S183).

Moreover, the second evaluation plug-in initializes the system evaluation value to "0" (step S185). Furthermore, the second evaluation plug-in identifies one unprocessed physical server from the identified physical servers (step S187). Then, the second evaluation plug-in calculates a cost value for that physical server according to the power-supply state for that identified physical server (step S189). In this embodiment, when the power-supply state is "ON", "0" set to the cost value, and when the power-supply state is "OFF", "10" is set to the cost value. The consideration about such cost value setting is the same as that explained in the first embodiment.

After that, the second evaluation plug-in calculates the total cost value for all of the identified physical servers by adding the cost value for the physical server to the system evaluation value (step S191). The second evaluation plug-in then determines whether or not there are any unprocessed physical servers (step S193). When there is an unprocessed physical server, the processing returns to the step S187. On the other hand, when there is no unprocessed server, the second evaluation plug-in outputs the system evaluation value, which is the total cost value, to the cost-value synthesizer 315, after which the processing returns to the processing of the calling source.

Figure 44:
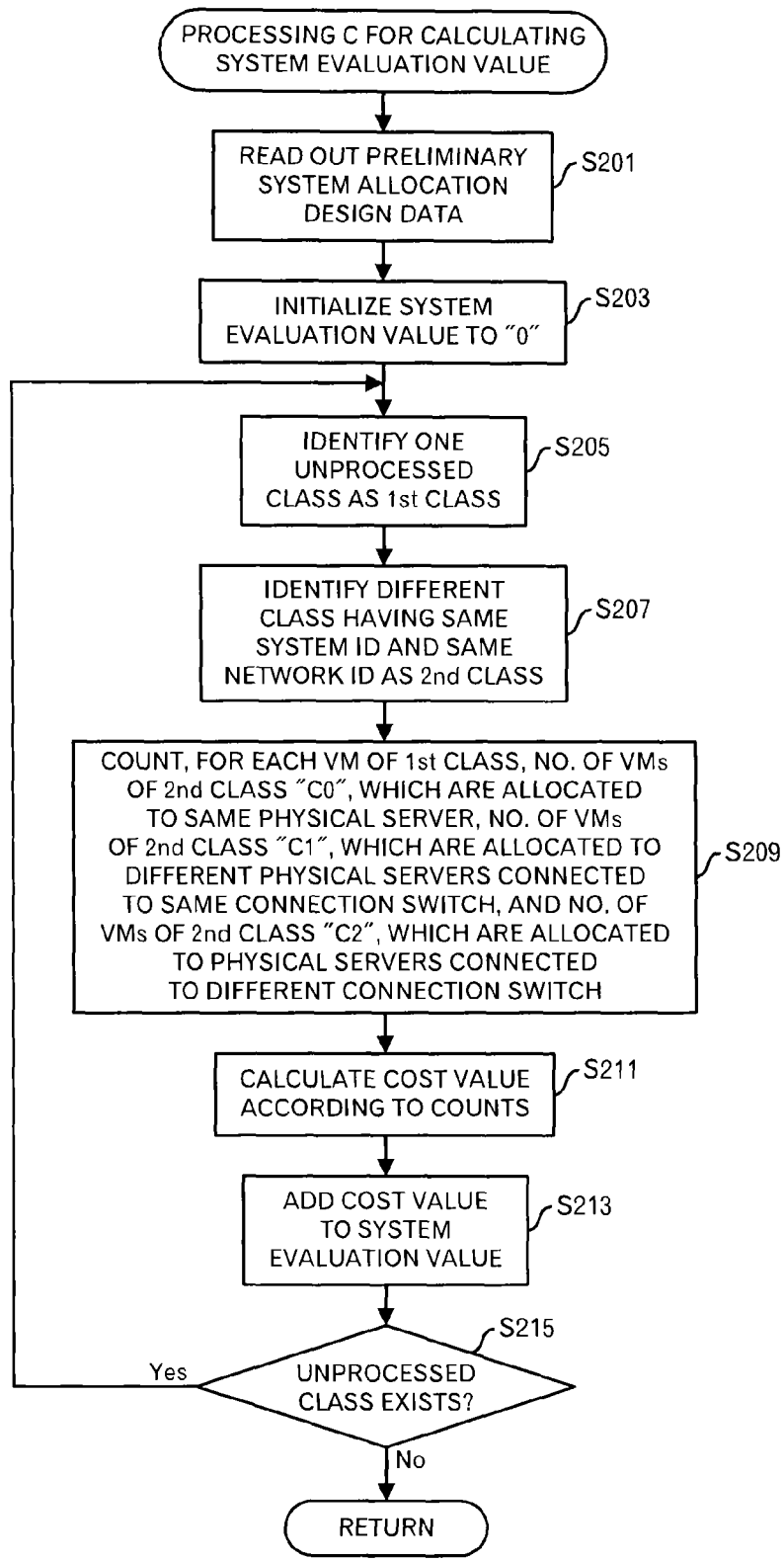
FIG. 44 is a diagram depicting a processing flow of the processing for calculating the system evaluation value by an evaluation plug-in for network utilization.

Furthermore, the processing C for calculating the system evaluation value for the case in which the third evaluation plug-in for the network utilization was invoked will be explained using FIG. 44.

First, the third evaluation plug-in reads preliminary system allocation design data or temporary preliminary system allocation design data (step S201). The third evaluation plug-in also initializes the system evaluation value to "0" (step S203). The third evaluation plug-in then identifies one unprocessed class from the preliminary system allocation design data or temporary preliminary system allocation design data as a first class (step S205). The first class will be a reference class. Next, the third evaluation plug-in identifies a different class having the same system ID and same network ID as the first class from the network management table in the allocation and configuration data storage unit 316 as a second class (step S207).

Then, for each virtual machine of the first class, the third evaluation plug-in counts the number of second class virtual machines C0 that are allocated to the same physical server, the number of virtual machines of the second class C1, which are allocated to different physical server that are connected to the same connection switch, and the number of virtual machines of the second class C2, which are allocated to physical servers that are connected to different connection switches (step S209). The method for counting is the same as that explained using FIG. 19 to FIG. 22. Then, the third evaluation plug-in calculates the cost value according to the count results (step S211). In this example, the equation "the sum of C0*a+the sum of C1*b+the sum of C2*c" is used. The coefficients a=1, b=2 and c=30 are used for example.

Furthermore, the third evaluation plug-in calculates the total cost value for all classes by adding the cost value to the system evaluation value (step S213). Then, the third evaluation plug-in determines whether there are any unprocessed classes (step S215). When there is an unprocessed class, the processing returns to the step S205. On the other hand, when there is no unprocessed class, the third evaluation plug-in returns "the system evaluation value"/2 to the cost-value synthesizer 315, after which the processing returns to the processing of the calling source. The reason "the system evaluation value"/2 is used is because connections between virtual machines are counted from both sides and so the count value becomes doubled.

Figure 41:
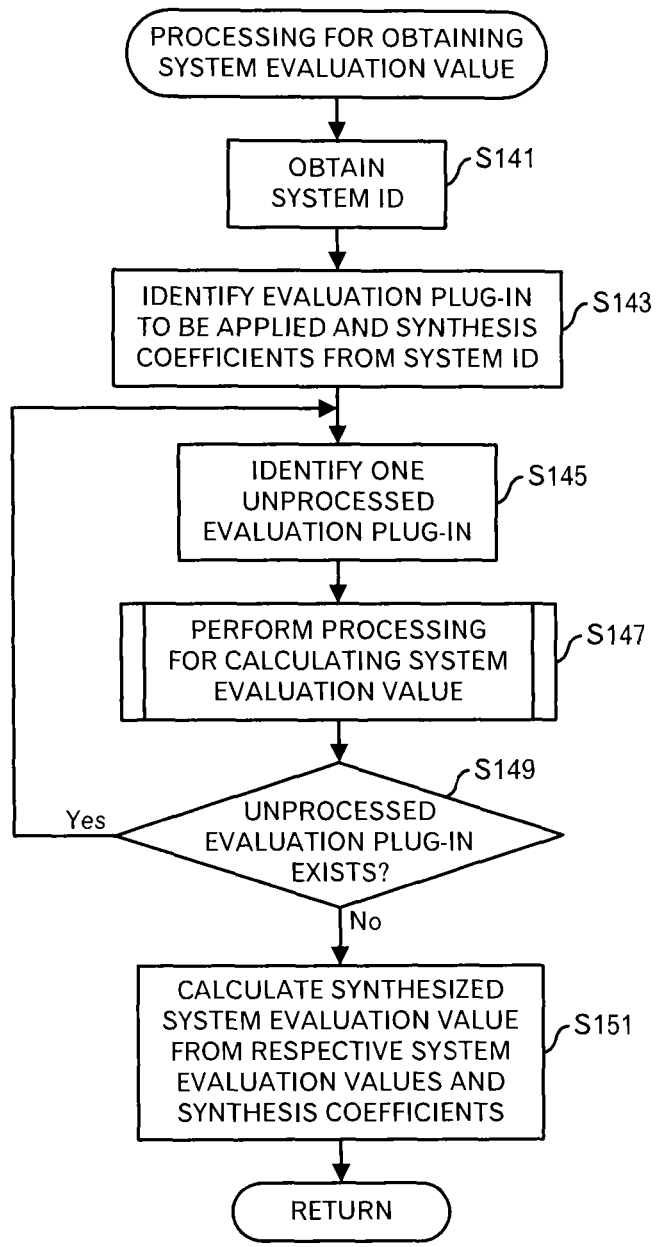
FIG. 41 is a diagram depicting a processing flow of a processing for obtaining a system evaluation value.

Returning to the explanation of the processing in FIG. 41, the cost-value synthesizer 315 determines whether there are any unprocessed evaluation plug-ins from among the identified evaluation plug-ins (step S149). When there is an unprocessed evaluation plug-in, the processing returns to the step S145. However, when there is no unprocessed evaluation plug-in, the cost-value synthesizer 315 calculates the total sum of the products of the system evaluation values acquired from the respective evaluation plug-ins and corresponding synthesis coefficients as the synthesized system evaluation value (step S151). The cost-value synthesizer 315 returns this synthesized system evaluation value to the controller 312. This synthesized system evaluation value is processed by the controller 312 as the system evaluation value.

By performing the processing such as described above, a system evaluation value, which is the total cost value after the system completion, is calculated.

Embodiment 3

Next, a third embodiment of this technique will be explained. In this embodiment, an example will be explained in which, by taking another look at the allocation destination physical server for each virtual machine after allocating virtual machines in a certain order, a processing is performed to search for the virtual machine allocation having a lower cost.

The system configuration is the mostly the same as in the first embodiment. The difference is that data for the designated number of physical servers (for example, 99 servers), which the upper limit number of physical servers that can be designated, such as illustrated in FIG. 33A, is stored in the setting data storage unit 317. Furthermore, in some cases, data for the timeout time (for example, 10 seconds) is stored, such as illustrated in FIG. 33B, so the controller 312 accesses the setting data storage unit 317. In FIG. 2, this access is represented by a dotted line.

The system processing in this third embodiment will be explained using FIG. 45 to FIG. 54.

Figure 45:
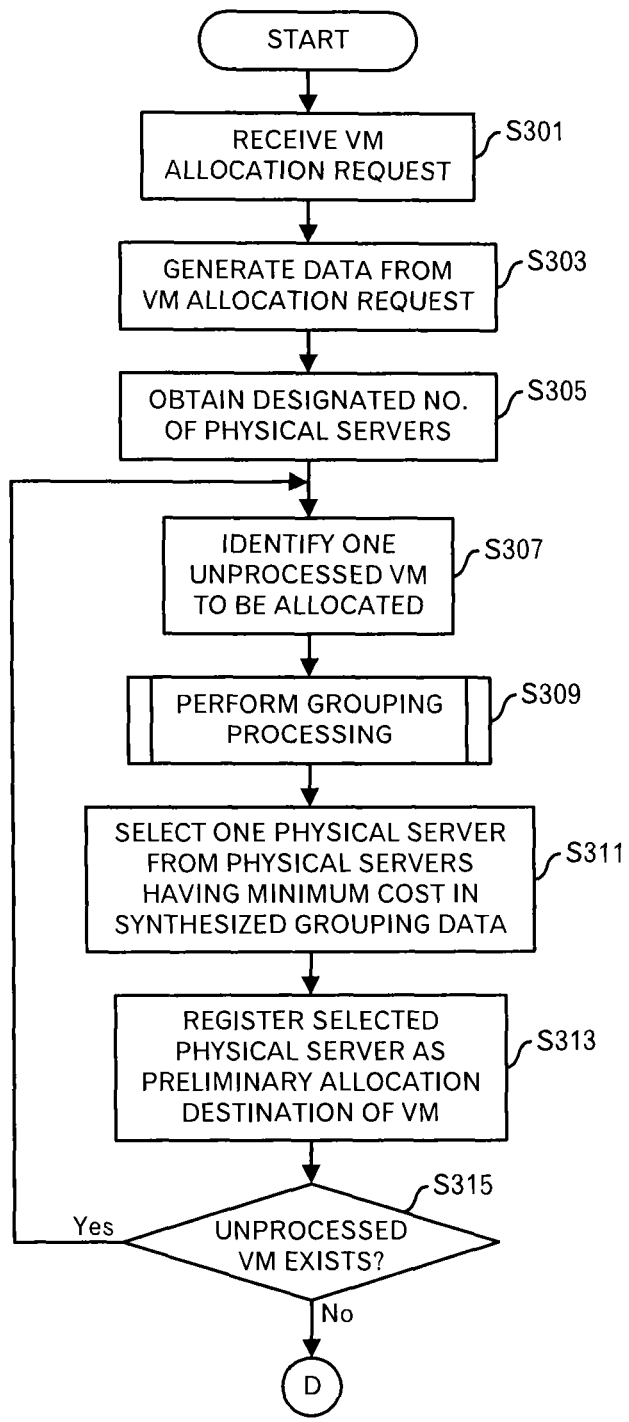
FIG. 45 is a diagram depicting a processing flow in a third embodiment.

For example, after the user apparatus A transmits a VM allocation request to a cloud center 3, the request receiver 311 of the allocation design apparatus 31 in the cloud center 3 receives that VM allocation request, and outputs the request to the controller 312 (FIG. 45: step S301). In this embodiment as well, the case is presumed in which the virtual machine allocation request is received that requests to allocate virtual machines for a system such as explained in the first embodiment to any of physical servers.

Next, the controller 312 generates data to be stored in the allocation and configuration data storage unit 316 from the received VM allocation request, and stores the generated data (step S303). As in the first embodiment, the controller 312 generates data of a system management table (FIG. 13), a network management table (FIG. 14) and a class management table (FIG. 15), and stores the generated data. These data can be generated from the VM allocation request described above.

The controller 312 also reads the designated number of physical servers, which is stored in the setting data storage unit 317 (step S305).

The controller 312 then identifies one unprocessed virtual machine from among the virtual machines to be allocated (step S307). Then, the controller 312 causes the cost-value synthesizer 315 and the evaluation unit 318 to perform a grouping processing for the identified virtual machine (step S309). This grouping processing is the same as in the first embodiment, so no further explanation will be given. As a result, the synthesized grouping data is generated.

Then, after receiving the synthesized grouping data from the cost-value synthesizer 315, the controller 312 selects one physical server according to a predetermined rule from among a group of physical servers in the synthesized grouping data having the lowest cost value (step S311). For example, in the physical server data, the physical server having the least remaining allocatable size may be selected, or conversely, the physical server having the greatest remaining allocatable size. Moreover, a physical server may be selected at random from the group of physical servers having the lowest cost value. Furthermore, one physical server may be selected according to another aspect.

The controller 312 then registers the ID of the selected physical server from the physical server data that is stored in the allocation and configuration data storage unit 316 as the preliminary allocation destination of the virtual machine that was identifies at the step S311, and also registers that ID in the VM management table (step S313).

After that, the controller 312 determines whether there are any unprocessed virtual machines of the virtual machines to be allocated (step S315). When there is an unprocessed virtual machine, the processing returns to the step S307. However, when there is no unprocessed virtual machine, the processing moves to the processing in FIG. 46 by way of terminal D.

Figure 46:
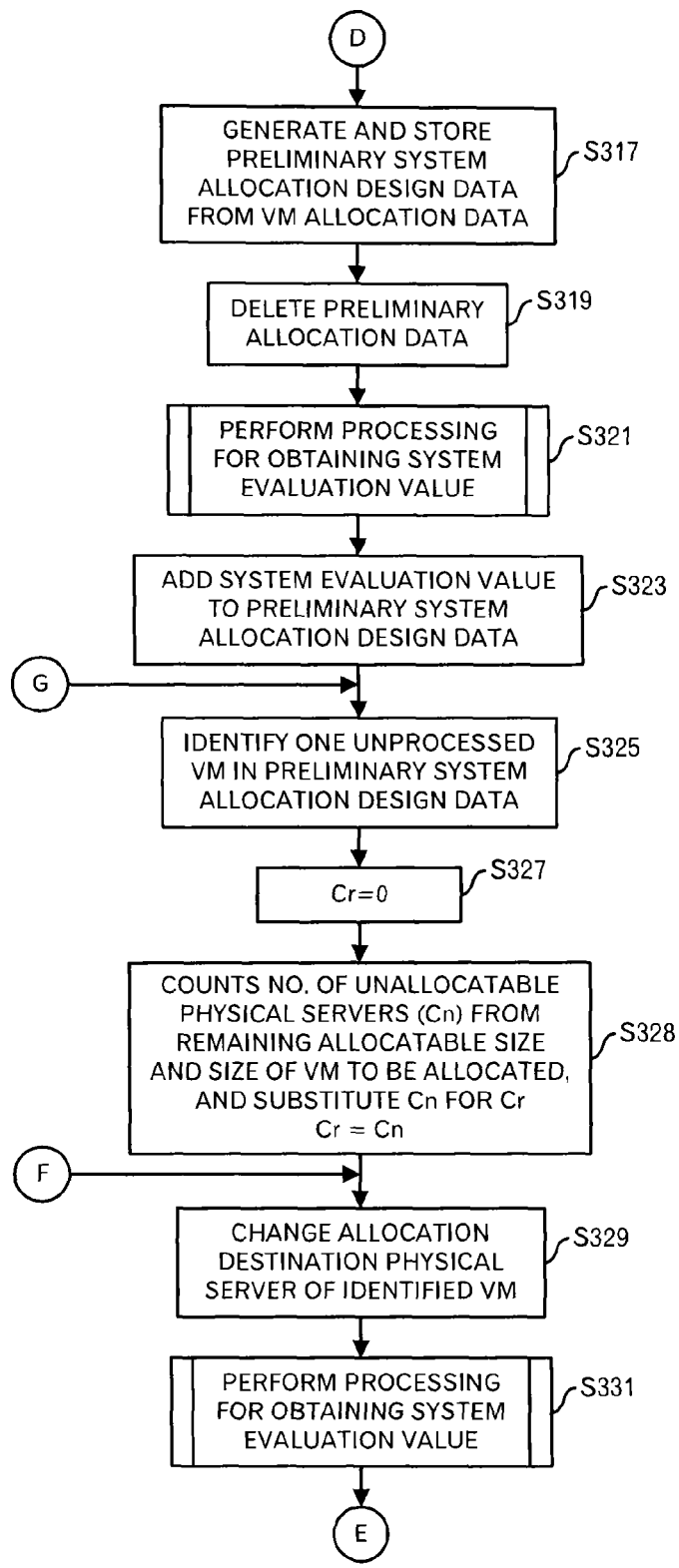
FIG. 46 is a diagram depicting a processing flow in the third embodiment.

Moving on to an explanation of the processing in FIG. 46, the controller 312 generates preliminary system allocation design data from the VM allocation data relating to the preliminary allocation in the VM management table or physical server data in the allocation and configuration data storage unit 316, and stores the generated data in the allocation and configuration data storage unit 316 (step S317). Moreover, the controller 312 deletes the preliminary allocation data for the virtual machines in the VM management table and physical server data in the allocation and configuration data storage unit 316 (step S319). This is because the preliminary allocation is repeatedly performed later. After that, the controller 312 causes the cost-value synthesizer 315 and evaluation unit 318 to perform a processing for obtaining a system evaluation value (step S321). This processing is the same as that explained in the second embodiment, and is performed based on the preliminary system allocation design data that was generated at the step S317.

The controller 312 then adds the system evaluation value that was calculated at the step S321 to the preliminary system allocation design data (step S323). In the case where the preliminary system allocation design data such as illustrated in FIG. 37 is obtained, the system evaluation value "216" is calculated, and as illustrated in FIG. 47, that system evaluation value is added to the preliminary system allocation design data. When the system evaluation value that is obtained from the evaluation plug-in for the availability is "0" and multiplied by the synthesis coefficient "1", the value becomes "0". Moreover, when the system evaluation value that is obtained from the evaluation plug-in for the power is "30" and multiplied by the synthesis coefficient "2", the value becomes "60". Furthermore, when the system evaluation value that is obtained from the evaluation plug-in for the network utilization is "156" and multiplied by the synthesis coefficient "1", the value becomes "156". The final system evaluation value then become "216". As illustrated in FIG. 47, a temporary server ID is also managed. However, nothing has yet been set for the temporary server ID.

Next, in order to gradually change the physical server that is the allocation destination of the virtual machines based on the preliminary system allocation design data that was generated at the step S317, the controller 312 identifies one unprocessed virtual machine in the preliminary system allocation design data (step S325). For example, the controller 312 identifies a virtual machine in order of VM005-05, VM005-06, VM005-07, VM005-08, VM005-01, VM005-02, VM005-03 and VM005-04. Then, the controller 312 initializes the counter Cr for counting the number of changed physical machines to "0" (step S327). Next, from the remaining allocatable size and from the size of the virtual machines to be allocated, the controller 312 counts the number of physical servers that can not be allocated, and substitutes that result Cn for the counter value Cr (step S328). After that, the controller 312 changes the physical server of the preliminary allocation destination for the identified virtual machine (step S329). For example, it is possible to employ a method such that the identification number of the physical server is shifted one at a time. However, the identification number could also be selected at random such that there is no duplication. Only the physical servers that can be allocated are identified from the remaining allocatable size and from the size of the virtual machines to be allocated.

For example, the physical server of the preliminary allocation destination for the virtual machine VM005-05 is changed from Svr013 to Svr014. However, here, it is assumed that it is not possible to lower the system evaluation value, even though the preliminary allocation destination physical server of each of the virtual machines VM005-05 to VM005-08 is changed to another physical server.

The controller 312 then performs the processing for obtaining the system evaluation value for the preliminary system allocation design data in which the change at the step S329 is reflected (step S331). This process is the same as that at the step S321. The processing then moves to the processing in FIG. 48 by way of terminal E.

Moving to an explanation of the processing in FIG. 48, the controller 312 determines whether the system evaluation value that was obtained at the step S331 is less than the evaluation value that is included in the preliminary system allocation design data (step S333). When the system evaluation value that was obtained at the step S331 is not lesser, the processing moves to step S337.

On the other hand, when the system evaluation value that was obtained at the step S331 is lesser, the controller 312 registers the ID of the preliminary allocation destination physical server after the change as the temporary server ID, and replaces the system evaluation value in the preliminary system allocation design data with the system evaluation value that was obtained at the step S331 (step S335). In the example above, when the physical server for the virtual machine VM005-01 is changed from the physical server Svr009 to Svr011, the system evaluation value obtained this time is presumed to be less than the system evaluation value before the change. For example, in this case, when the system evaluation vale for the network utilization is "97" and multiplied by the synthesis coefficient "1", the value becomes "97". The other system evaluation values are the same, and the total becomes "157". Therefore, the preliminary system allocation design data such as illustrated in FIG. 49 is changed. The physical server of the preliminary allocation destination for VM005-01 is changed to Svr011, and the temporary server ID is also changed to Svr011. Furthermore, the system evaluation value is changed to "157". Next, the controller 312 changes the "already processed VM" other than the current VM to "unprocessed VM" (step S336).

After that, the controller 312 determines whether the counter Cr is equal to or greater than the designated number of physical servers (step S337). The controller 312 checks whether the counter Cr is equal to or greater than the designated number of physical servers, which is set in the setting data storage unit 317. When the counter Cr is less than the designated number of physical servers, the controller 312 increments the value of the counter Cr by "1" (step S338), after which the processing returns to the step S329 by way of terminal F.

On the other hand, when the counter Cr is equal to or greater than the designated number of physical servers, the controller 312 replaces the ID of the preliminary allocation destination physical server of the virtual machine that was identified at the step S325 with the temporary server ID (step S339). Then, the controller 312 clears the temporary server ID (step S341). Furthermore, the controller 312 determines whether or not there is an unprocessed virtual machine (step S343). When there is an unprocessed virtual machine, the processing returns to the step S325 by way of terminal G.

In the example described above, the system evaluation value cannot be lowered even though the preliminary allocation destination physical server for the virtual machine VM005-01 is changed, so the temporary server ID is cleared and the state is transitioned to a state such as illustrated in FIG. 50. Next, the preliminary allocation destination physical server for the virtual machine VM005-02 is changed, however, when the preliminary allocation destination physical server is changed to Svr012 for example, the system evaluation value of the evaluation plug-in for the availability is "30", and the synthesis coefficient is "1", so the system evaluation value is calculated as "30", the system evaluation value of the evaluation plug-in for the power is "30", and the synthesis coefficient is "2", so the system evaluation value is calculated as "60", and the system evaluation value of the evaluation plug-in for the network utilization is "9", and the synthesis coefficient is "1", so the system evaluation value is calculated as "9". Therefore, the total system evaluation value becomes "99". The preliminary system allocation design data becomes the state as illustrated in FIG. 51. In other words, "Svr012" is set as the preliminary allocation destination physical server for the virtual machine VM005-02, "Svr012" is set as the temporary server ID, and "99" is set as the system evaluation value.

Furthermore, when the preliminary allocation destination physical server for the virtual machine VM005-02 is changed to Svr014, the system evaluation value of the evaluation plug-in for the availability becomes "0", the system evaluation value of the evaluation plug-in for the power is "40", the synthesis coefficient is "2", and a system evaluation value of "80" is obtained by taking the product of them. Furthermore, the system evaluation value of the evaluation plug-in for the network utilization is "10", the synthesis coefficient is "1", and a system evaluation value of "10" is obtained by taking the product of them. In other words, the total system evaluation value is "90", and the least system evaluation value up to this point was obtained. Therefore, the preliminary system allocation design data is changed as illustrated in FIG. 52. That is, the preliminary allocation destination physical server for the virtual machine VM005-02 is changed to "Svr014", the temporary server ID is changed to "Svr014", and the system evaluation value is changed to "90". After this, the system evaluation value for the virtual machine VM005-02 will not become lesser, so the state is changed to a state such as illustrated in FIG. 53. In other words, the temporary server ID is cleared. After this, it is assumed that the system evaluation value will not become a lesser value.

Returning to the explanation of the processing in FIG. 48, when there is no unprocessed virtual machine, the controller 312 reflects the preliminary system allocation design data on the VM management table and physical server data in the allocation and configuration data storage unit 316 (step S345). In other words, the data of the ID of the preliminary allocation virtual machine is updated. After that, the controller 312 generates VM allocation design data from the preliminary system allocation design data, and stores the generated data in the allocation design data storage unit 313 (step S347). For example, the controller 312 generates VM allocation design data such as illustrated in FIG. 54. The output unit 314 outputs this kind of VM allocation design data to the management apparatus 33.

When the VM allocation design data such as described above is obtained, the management apparatus 33 is able to properly activate virtual machines on a designated physical server.

For example, when automatically activating virtual machines, the controller 312 updates the state of the VM management table and physical server data in the allocation and configuration data storage unit 316 according to the VM allocation design data relating to an allocation completion notification based on the allocation completion notification from the management apparatus 33. More specifically, the virtual machine ID that is registered in the column of the ID of the preliminary-allocated virtual machine is reregistered in the column of the ID of the allocated virtual machine.

By performing the processing such as described above, evaluation is flexibly performed for the physical servers for each user or system, and design data that properly allocates virtual machines to physical servers according to the synthesized cost value based on the evaluation results is obtained. Differing from the first and second embodiments, the physical server of the preliminary allocation destination, which was determined once, gradually changes, and another physical server that has a lesser system evaluation value is searched, so it is possible to allocate a virtual machine having a low cost for the requirement that have to be considered for a user or a system.

An example in which a system is newly deployed was explained above, however, nearly the same processing can be used in the case where a virtual machine is added to a certain system. It may be necessary to adjust the cost value for the network utilization.

After the processing in the second embodiment is performed in the third embodiment, the processing such as described above of changing the physical server of the preliminary allocation destination for a virtual machine may be performed.

Although the embodiments of this technique were explained above, this technique is not limited to those. For example, the functional block diagrams of the aforementioned apparatuses are mere examples, and do not always correspond to an actual program module configuration. In addition, as for the processing flow, as long as the processing results are not changed, turns of the processing may be changed, and plural steps may be executed in parallel.

Furthermore, as for the evaluation plug-in, an example of the algorithm was explained above, however, another algorithm may be employed. Furthermore, more kinds of plug-ins may be employed.

Figure 55:
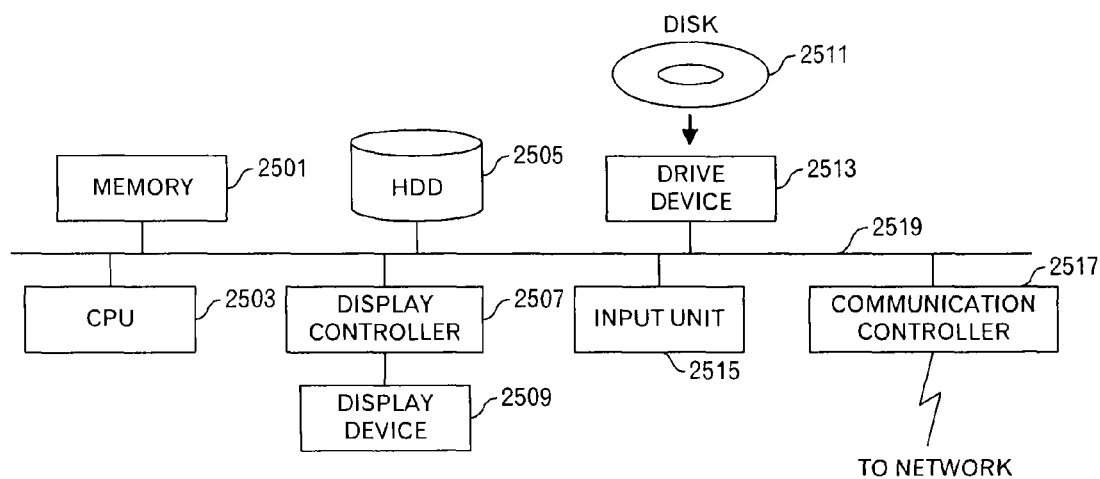
FIG. 55 is a functional block diagram of a computer.

In addition, the aforementioned an allocation design apparatus 31, user apparatus and a management apparatus 33 are computer devices as illustrated in FIG. 55. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as illustrated in FIG. 55. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer apparatus as stated above, the hardware such as the CPU 2503 and the memory 2501, the OS and the application programs systematically cooperate with each other, so that various functions as described above in details are realized.

The aforementioned embodiments are outlined as follows:

An allocation design method relating to the embodiments of this technique includes (A) receiving a request to allocate one or plural virtual machines for a system that includes the one or plural virtual machines to one or plural physical machine; (B) reading out first data concerning an evaluation indicator for virtual machine allocation, wherein the first data is registered in association with the system or a requesting source of the request; (C) first calculating, for each virtual machine of the one or plural virtual machines, a first cost in case where the virtual machine is allocated to any one of usable physical machines, based on the read first data to identify, for each virtual machine of the one or plural virtual machines, a physical machine for which the calculated first cost is the least; and (D) generating allocation design data including second data concerning the physical machine identified for each virtual machine of the one or plural virtual machines.

When the data concerning the evaluation indicator is set for each user or transmission source of the request, it is possible to flexibly determine the physical machine to which the virtual machine is allocated according to the user or transmission source of the request.

The first calculating may include: for each virtual machine of the one or plural virtual machines, (c1) calculating a second cost for each of the usable physical machines for each of evaluation indicators included in the first data; and (c2) calculating, for each of the usable physical machines, the first cost by adding the second cost calculated for each evaluation indicator of the evaluation indicators with a corresponding weight for the evaluation indicator, which is included in the first data. Thus, by combining the evaluation indicator and weight, it is possible to flexibly define a calculation method of the cost value, and to flexibly determines the physical machine of the allocation destination.

Moreover, in the first calculating, a virtual machine among the plural virtual machine may be selected in an arbitrary order, and for each evaluation indicator, the second cost may be calculated by taking into consideration influence for a prior processed virtual machine and a physical machine identified for the prior processed virtual machine. When the allocation destination physical machine is identified for the virtual machine one-by-one in an arbitrary order, the cost calculation processing becomes simple.

Furthermore, the first calculating may be executed plural times so as to select a virtual machine in different order. In such a case allocation design method may further include: (E) each time when the first calculating is executed, calculating an evaluation value for a correlation between each of the plural virtual machines and a physical machine, based on the first data, wherein the correlation is identified by the first calculating; and (F) identifying a correlation for which the least evaluation value is calculated. When a method is employed in which the solution may be different according to the allocation order of the virtual machines, the allocation destination physical machine of the virtual machine, for which the evaluation value that is the entire cost value is the least may be searched for, while changing the allocation order.

Moreover, the allocation design method may further include (G) after at least one of physical machines identified for the plural virtual machines by performing the first calculating is changed to another physical machine, calculating an evaluation value for a correlation between each of the plural virtual machine and a physical machine, based on the first data; and (H) identifying a correlation for which the least evaluation value is calculated. Thus, a much proper physical machine of the allocation destination may be found.

Figure 56:
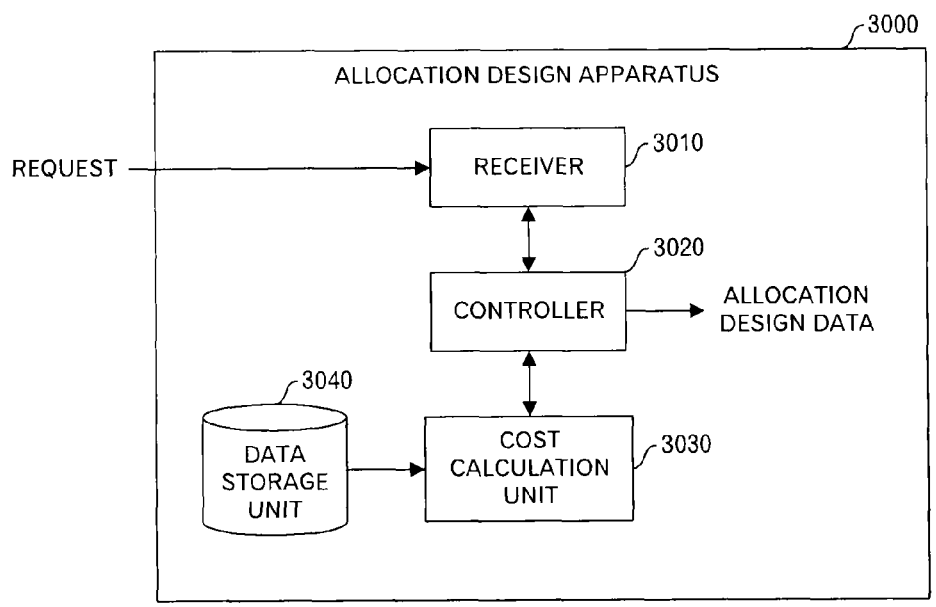
FIG. 56 is a functional block diagram of an allocation design apparatus.

An allocation design apparatus relating to the embodiments includes a receiver (FIG. 56: 3010) that receives a request to allocate one or plural virtual machines for a system that includes the one or plural virtual machines to one or plural physical machine; a cost calculation unit (FIG. 56: 3030) that reads out first data concerning an evaluation indicator for virtual machine allocation, wherein the first data is registered in association with the system or a requesting source of the request, and calculates, for each virtual machine of the one or plural virtual machines, a first cost in case where the virtual machine is allocated to any one of usable physical machines, based on the read first data; and a controller (FIG. 56: 3020) that instructs the cost calculation unit to perform a processing, identifies, for each virtual machine of the one or plural virtual machines, a physical machine for which the calculated first cost is the least, and generates allocation design data including second data concerning the physical machine identified for each virtual machine of the one or plural virtual machines.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory (e.g. ROM), and hard disk. In addition, the intermediate processing result is temporarily stored in a storage device such as a main memory or the like.

What is claimed is:

1. A computer-readable, non-transitory storage medium storing a program for causing a computer to execute a process comprising:
receiving a request to allocate one or plural virtual machines for a system that includes the one or plural virtual machines to one or plural physical machines;
selecting first data concerning one or plural evaluation indicators for a requesting source user of the request among data that is concerned with one or plural evaluation indicators for virtual machine allocation and is registered in advance for each of a plurality of users;
first calculating, for each virtual machine of the one or plural virtual machines, a first cost in case where the virtual machine is allocated to any one of usable physical machines of the one or more plural physical machines, based on the selected first data to identify, for each virtual machine of the one or plural virtual machines, a physical machine for which the calculated first cost is the least among the one or plural physical machines;
generating allocation design data including second data concerning the physical machine identified for each virtual machine of the one or plural virtual machines; and
allocating the one or plural virtual machines according to the generated allocation design data, wherein
the first calculating comprises
for each virtual machine of the one or plural virtual machines,
calculating a second cost for each of the usable physical machines of the one or plural physical machines for each of evaluation indicators included in the first data; and
calculating, for each of the usable physical machines of the one or plural physical machines, the first cost by adding the second cost calculated for each evaluation indicator of the evaluation indicators with a corresponding weight for the evaluation indicator, which is included in the first data.

2. The computer-readable, non-transitory storage medium as set forth in claim 1, wherein, in the first calculating, a virtual machine among the plural virtual machine is selected in an arbitrary order, and
for each evaluation indicator, the second cost is calculated by taking into consideration influence for a prior processed virtual machine and a physical machine identified for the prior processed virtual machine.

3. The computer-readable, non-transitory storage medium as set forth in claim 2, wherein the first calculating is executed plural times so as to select a virtual machine in different order, and the process further comprises:
each time when the first calculating is executed, calculating an evaluation value for a correlation between each of the plural virtual machines and a physical machine of the one or plural physical machines, based on the first data, wherein the correlation is identified by the first calculating; and
identifying a correlation for which the least evaluation value is calculated.

4. The computer-readable, non-transitory storage medium as set forth in claim 2, wherein the process further comprises:

after at least one of physical machines of the one or plural physical machines, which is identified for the plural virtual machines by performing the first calculating is changed to another physical machine, calculating an evaluation value for a correlation between each of the plural virtual machine and a physical machine, based on the first data; and
identifying a correlation for which the least evaluation value is calculated.

5. An allocation design method, comprising:
receiving, by using a computer, a request to allocate one or plural virtual machines for a system that includes the one or plural virtual machines to one or plural physical machines;
selecting, by using the computer, first data concerning one or plural evaluation indicators for a requesting source user of the request among data that is concerned with one or plural evaluation indicators for virtual machine allocation and is registered in advance for each of a plurality of users;
first calculating, by using the computer and for each virtual machine of the one or plural virtual machines, a first cost in case where the virtual machine is allocated to any one of usable physical machines of the one or plural physical machines, based on the selected first data to identify, for each virtual machine of the one or plural virtual machines, a physical machine for which the calculated first cost is the least among the one or plural physical machines;
generating, by using the computer, allocation design data including second data concerning the physical machine identified for each virtual machine of the one or plural virtual machines; and
allocating the one or plural virtual machines according to the generated allocation design data, wherein
the first calculating comprises
for each virtual machine of the one or plural virtual machines,
calculating a second cost for each of the usable physical machines of the one or plural physical machines for each of evaluation indicators included in the first data; and
calculating, for each of the usable physical machines of the one or plural physical machines, the first cost by adding the second cost calculated for each evaluation indicator of the evaluation indicators with a corresponding weight for the evaluation indicator, which is included in the first data.

6. An allocation design apparatus, comprising:
a memory; and
a processor configured to use the memory and execute a process comprising:
receiving a request to allocate one or plural virtual machines for a system that includes the one or plural virtual machines to one or plural physical machines;
selecting first data concerning one or plural evaluation indicators for a requesting source user of the request among data that is concerned with one or plural evaluation indicators for virtual machine allocation and is registered in advance for each of a plurality of users;
first calculating, for each virtual machine of the one or plural virtual machines, a first cost in case where the virtual machine is allocated to any one of usable physical machines of the one or plural physical machines, based on the selected first data to identify, for each virtual machine of the one or plural virtual machines, a physical machine for which the calculated first cost is the least among the one or plural physical machines;

generating allocation design data including second data concerning the physical machine identified for each virtual machine of the one or plural virtual machines; and allocating the one or plural virtual machines according to the generated allocation design data, wherein the first calculating comprises for each virtual machine of the one or plural virtual machines, calculating a second cost for each of the usable physical machines of the one or plural physical machines for each of evaluation indicators included in the first data; and calculating, for each of the usable physical machines of the one or plural physical machines, the first cost by adding the second cost calculated for each evaluation indicator of the evaluation indicators with a corresponding weight for the evaluation indicator, which is included in the first data.

* * * * *